United States Patent
Abe et al.

(10) Patent No.: US 8,868,864 B2
(45) Date of Patent: Oct. 21, 2014

(54) STORAGE APPARATUS AND STORAGE APPARATUS CONTROL METHOD

(75) Inventors: Marie Abe, Kawasaki (JP); Koutarou Nimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 13/537,187

(22) Filed: Jun. 29, 2012

(65) Prior Publication Data

US 2013/0046945 A1    Feb. 21, 2013

(30) Foreign Application Priority Data

Aug. 15, 2011  (JP) ................... 2011-177489

(51) Int. Cl.
*G06F 12/16*    (2006.01)
*G06F 11/10*    (2006.01)
*G06F 3/06*     (2006.01)
*G06F 11/20*    (2006.01)
*G06F 11/16*    (2006.01)

(52) U.S. Cl.
CPC .......... *G06F 3/0611* (2013.01); *G06F 11/2069* (2013.01); *G06F 11/108* (2013.01); *G06F 11/1096* (2013.01); *G06F 11/1662* (2013.01); *G06F 3/0689* (2013.01); *G06F 3/0619* (2013.01); *G06F 11/2056* (2013.01); *G06F 11/2094* (2013.01); *G06F 3/0647* (2013.01)

USPC ........................................ 711/162

(58) Field of Classification Search
None
See application file for complete search history.

(56) References Cited

U.S. PATENT DOCUMENTS 6,788,575 B2   9/2004  Kozakai et al.

FOREIGN PATENT DOCUMENTS

| JP | 08-96589 A | 4/1996 |
|----|------------|--------|
| JP | 2004-118407 A | 4/2004 |
| JP | 2010-146220 A | 7/2010 |

*Primary Examiner* — Duc Doan
(74) *Attorney, Agent, or Firm* — Fujitsu Patent Center

(57) ABSTRACT

A selector calculates a difference between the number of write operations of a first storage medium and that of a second storage medium and takes the difference as a first difference. Further, the selector calculates a difference between the number of write operations of the first storage medium and that of a third storage medium after copying the data within the second storage medium to the third storage medium and takes the difference as a second difference. Then, the selector selects the second storage medium as a target of replacement with which the second difference is larger than the first difference. A setting changer copies the data stored in the second storage medium selected as a target of replacement to the third storage medium, and changes the setting of the second storage medium to a spare and the setting of the third storage medium to a data write destination.

8 Claims, 16 Drawing Sheets

FIG. 4

SCHEDULE SETTING TABLE 151a

| DEVICE NUMBER | MOUNTED PERIOD LENGTH (MONTHS) | PRIORITY | IN-USE PERIOD LENGTH (MONTHS) | STANDBY PERIOD LENGTH (MONTHS) |
|---|---|---|---|---|
| 1 | 23 | 4 | 10 | 0 |
| 2 | 11 | 3 | 9 | 1 |
| 3 | 6 | 2 | 8 | 2 |
| 4 | 3 | 1 | 7 | 3 |
| SPARE 1 | 25 | — | 6 | 4 |

FIG. 13

| | RAID #1 STORAGE DEVICE #1 | RAID #1 STORAGE DEVICE #2 | RAID #2 STORAGE DEVICE #3 | RAID #2 STORAGE DEVICE #4 | SPARE STORAGE DEVICE |
|---|---|---|---|---|---|
| BEFORE FIRST REPLACEMENT | SSD A 20,000 TIMES | SSD B 20,000 TIMES | SSD C 20,000 TIMES | SSD D 20,000 TIMES | SSD E ZERO TIMES |
| AFTER FIRST REPLACEMENT | SSD A 20,000 TIMES | SSD E 5,000 TIMES | SSD C 20,000 TIMES | SSD D 20,000 TIMES | SSD B 20,000 TIMES |
| BEFORE SECOND REPLACEMENT | SSD A 40,000 TIMES | SSD E 25,000 TIMES | SSD C 40,000 TIMES | SSD D 40,000 TIMES | SSD B 20,000 TIMES |
| AFTER SECOND REPLACEMENT | SSD A 40,000 TIMES | SSD E 25,000 TIMES | SSD C 40,000 TIMES | SSD B 25,000 TIMES | SSD D 40,000 TIMES |
| BEFORE THIRD REPLACEMENT | SSD A 60,000 TIMES | SSD E 45,000 TIMES | SSD C 60,000 TIMES | SSD B 45,000 TIMES | SSD D 40,000 TIMES |
| AFTER THIRD REPLACEMENT (NO RELACEMENT) | SSD A 60,000 TIMES | SSD E 45,000 TIMES | SSD C 60,000 TIMES | SSD B 45,000 TIMES | SSD D 40,000 TIMES |
| BEFORE FOURTH REPLACEMENT | SSD A 80,000 TIMES | SSD E 65,000 TIMES | SSD C 80,000 TIMES | SSD B 65,000 TIMES | SSD D 40,000 TIMES |
| AFTER FOURTH REPLACEMENT | SSD A 80,000 TIMES | SSD D 45,000 TIMES | SSD C 80,000 TIMES | SSD B 65,000 TIMES | SSD E 65,000 TIMES |

STORAGE APPARATUS AND STORAGE APPARATUS CONTROL METHOD

CROSS-REFERENCE TO RELATED APPLICATION

This application is based upon and claims the benefit of priority of the prior Japanese Patent Application No. 2011-177489, filed on Aug. 15, 2011, the entire contents of which are incorporated herein by reference.

FIELD

The embodiments discussed herein relate to a storage apparatus and a storage apparatus control method.

BACKGROUND

The storage capacity of a storage apparatus that makes use of storage media, such as a magnetic disk, a magneto-optical disk, and an optical disk, is being increased. As to an increase in storage capacity of a storage apparatus, a technique to configure a storage apparatus that has improved reliability by integrating a plurality of storage media called RAID (Redundant Arrays of Inexpensive Disks) is widely known.

Further, a storage apparatus that uses the RAID is also used, in which a nonvolatile semiconductor memory, such as a SSD (Solid State Drive) using a flash memory, excellent in random access performance is used as a storage medium to improve data access at the time of random access.

However, there is a limit to the number of write operations of a semiconductor memory, such as a flash memory, when in use, and it is not possible to perform writing a predetermined number of times or more. As described above, there is a storage medium in which an upper limit is set to the number of write operations in terms of the number of times of use, the in-use time, etc.

For the management of the number of write operations of a semiconductor memory, there are some known techniques. Please see, for example, Japanese Laid-Open Patent Publications Nos. 2010-146220, 2004-118407, and 08-96589.

Here, the storage apparatus uses a RAID including a plurality of storage media, but, there is such a problem that it becomes necessary to perform replacement when a plurality of storage media reaches an upper limit of the number of write operations at the same time or that there is a case where redundancy is not maintained when a failure occurs.

SUMMARY

According to an aspect, there is provided a storage apparatus that includes: a plurality of storage media, wherein at least two storage media are set as a data write destination and at least one storage medium other than the storage media set as a data write destination is set as a spare; and one or more processors configured to perform a procedure that includes: writing input data to a storage medium set as a data write destination; counting the number of write operations performed on each of the plurality of storage media; selecting a second storage medium as a target of replacement, wherein a difference between the number of write operations of a first storage medium set as a data write destination and the number of write operations of the second storage medium set as a data write destination is smaller than a difference between the number of write operations of the first storage medium, and a value determined based on the number of write operations of a third storage medium set as a spare and the number of write operations occurring at the time of copying of data within the second storage medium to the third storage medium; copying the data stored in the second storage medium selected as a target of replacement to the third storage medium; and changing the setting of the second storage medium to a spare and the setting of the third storage medium to a data write destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates a schedule setting table of the second embodiment;

FIG. 13 illustrates transition of the number of write operations of the storage device of the third embodiment;

DESCRIPTION OF EMBODIMENTS

Figure 1:
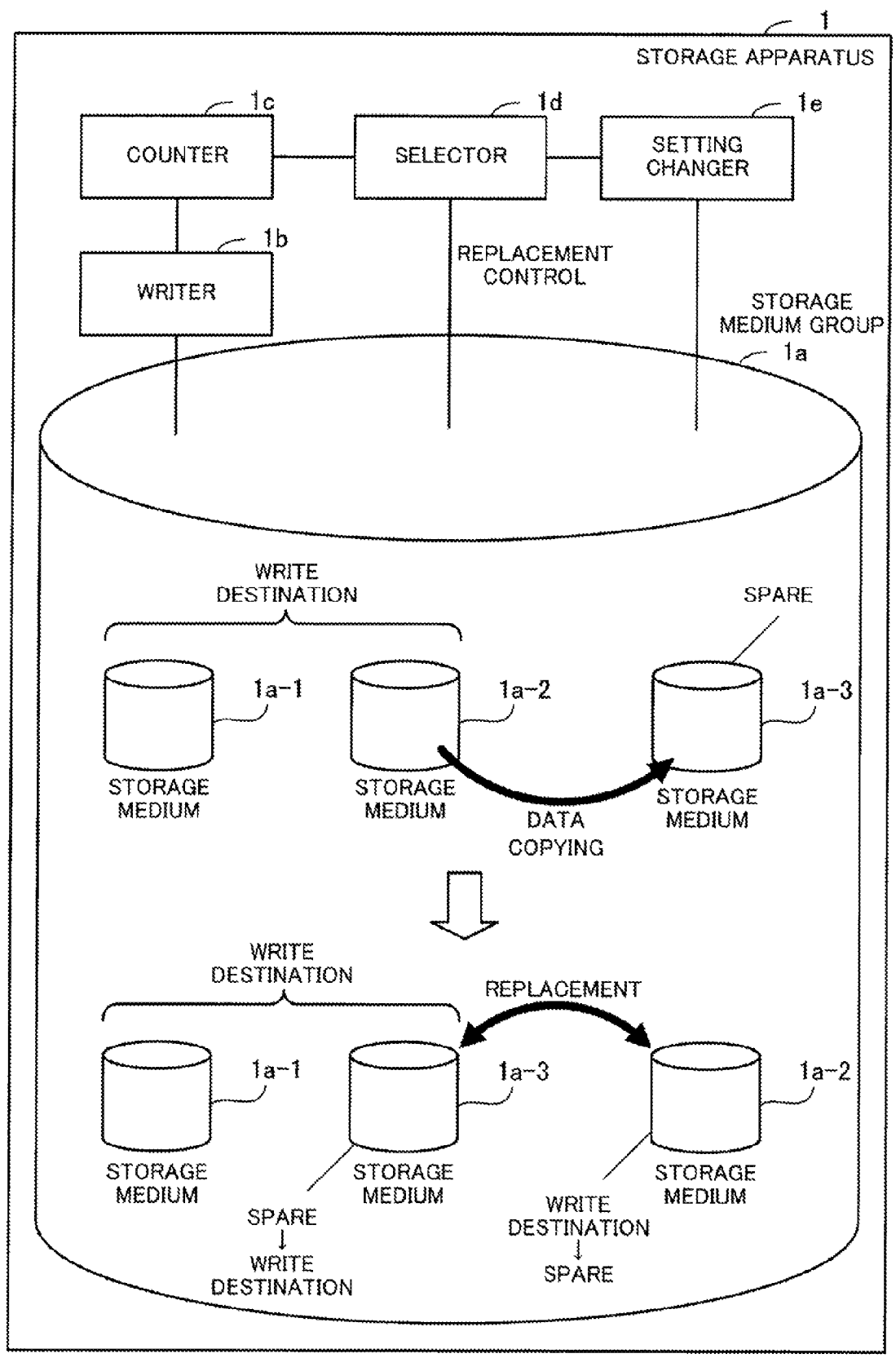
FIG. 1 illustrates a storage apparatus of a first embodiment.

Several embodiments will be described below with reference to the accompanying drawings, wherein like reference numerals refer to like elements throughout.

First Embodiment

FIG. 1 illustrates a storage apparatus of a first embodiment. A storage apparatus 1 of the first embodiment has a storage medium group 1*a*, a writer 1*b*, a counter 1*c*, a selector 1*d*, and a setting changer 1*e*. The storage medium group 1*a* is provided, for example, within a device enclosure.

The storage medium group 1*a* includes a plurality of storage media 1*a*-1, 1*a*-2, and 1*a*-3. At least two of the plurality of storage media 1*a*-1, 1*a*-2, and 1*a*-3 are set as a data write destination and at least one storage medium other than those set as a data write destination is set as a spare.

The writer 1b writes input data to the storage medium set as a data write destination.

The counter 1c counts the number of write operations performed on the plurality of storage media 1a-1, 1a-2, and 1a-3, respectively.

The selector 1d selects a storage medium of target of replacement from among the storage media 1a-1 and 1a-2 set as a data write destination. For example, the selector 1d takes one of the storage media 1a-1 and 1a-2 set as a data write destination to be a first storage medium, the other to be a second storage medium, and one of the storage media set as a spare to be a third storage medium. In the example of FIG. 1, it is assumed that the storage medium 1a-1 is taken to be the first storage medium, the storage medium 1a-2 to be the second storage medium, and the storage medium 1a-3 to be the third storage medium. In this case, the selector 1d selects a target of replacement as follows.

The selector 1d calculates a difference between the number of write operations of the first storage medium (storage medium 1a-1) and the number of write operations of the second storage medium (storage medium 1a-2) and takes the difference to be a first difference. Further, the selector 1d calculates a value, which is obtained by adding, to the number of write operations of the third storage medium (storage medium 1a-3), the number of write operations occurring when the data within the second storage medium (storage medium 1a-2) is copied to the third storage medium (storage medium 1a-3) is added, and takes the value to be an estimated number of write operations. Furthermore, the selector 1d calculates a difference between the number of write operations of the first storage medium (storage medium 1a-1) and the estimated number of write operations and takes the difference to be a second difference. Then, the selector 1d selects the second storage medium 1a-2 as a target of replacement, the replacement of which makes the second difference larger than the first difference.

The setting changer 1e copies the data stored in the second storage medium (storage medium 1a-2) selected as a target of replacement to the third storage medium (storage medium 1a-3), changes the setting of the second storage medium (storage medium 1a-2) to a spare, and changes the setting of the third storage medium (storage medium 1a-3) to a data write destination.

As described above, the second storage medium is selected as a target of replacement, wherein when the setting of the second storage medium is changed to a spare, the difference in the number of write operations among the storage media set as a data write destination after the change is larger than that before the change. Then, the setting of the second storage medium of a target of replacement is changed to a spare and the setting of the third storage medium is changed to a data write destination. Due to this, the difference in the number of write operations between the storage media set as a data write destination increases, and therefore, it is possible to prevent a plurality of storage media from reaching the upper limit of the number of write operations at the same time.

It may also be possible to select a storage medium of target of replacement, for example, according to a schedule determined in advance instead of selecting a storage medium of target of replacement based on the number of write operations of each storage medium. For example, a schedule is defined, in which periods during which the plurality of storage media 1a-1, 1a-2, and 1a-3 is set as a data write destination during a unit period within the storage device 1 are determined and the lengths of the periods are determined nonuniformly among the storage media. Then, the selector 1d selects a storage medium set as a data write destination as a target of replacement based on the schedule so that the length of the period during which each storage medium is set as a data write destination during the unit period agrees with the schedule.

If a storage medium of a target of replacement is selected according to such a schedule, the length of the period during which each storage medium is used as a data write destination differs from one another during the unit period during which the storage device 1 is operated. It is considered that the number of write operations performed on each storage medium is correlated to the period during which each storage medium is used as a data write destination. That is, it is considered that the storage medium with the longer period to be used as a data write destination has the larger number of data write operations during the unit period. Hence, the number of write operations is performed on each storage medium during the unit period becomes nonuniform among the storage media. As a result of that, it is possible to prevent a plurality of storage media from reaching the upper limit of the number of write operations at the same time.

It is also possible for the storage device 1 to create a schedule, for example, based on the lengths of the periods during which the storage media 1a-1, 1a-2, and 1a-3 are mounted in the storage device 1. For example, it is supposed that the storage medium with the longer mounted period has the larger number of write operations processing already performed compared to the storage medium with the shorter mounted period. Consequently, the storage device 1 creates a schedule so that the period during which the storage medium with the shorter mounted period is set as a data write destination during the unit period is shorter than that of the storage medium with the longer mounted period. By selecting a target of replacement from among the storage media set as a data write destination according to the schedule created in this manner, the storage medium with the longer mounted period has the larger number of write operations performed during the unit period. In other words, the shorter the mounted period of the storage medium, the more the number of writer operations performed during the unit period is suppressed. As described above, by selecting a storage medium of target of replacement based on the schedule in which the period during which the storage medium is set as a data write destination is set in accordance with the length of the mounted period, it is possible to increase the difference in the number of write operations among storage media accompanying the operation of the storage device 1.

The storage medium 1a-3 set as a spare remains normally on standby with the power source turned on until the setting thereof is changed to, for example, a data write destination. It may also be possible for the storage medium 1a-3 set as a spare to remain on standby with the power source turned off, the power source being turned on when the data of the storage medium set at a data write destination is copied prior to the copying processing.

The number of storage media that the storage device 1 of the first embodiment replaces is arbitrary. Further, the number of storage media set as a data write destination of the storage media is an arbitrary number not less than two. Furthermore, the number of storage media set as a spare of the storage media is an arbitrary number not less than one.

Second Embodiment

Next, an embodiment in which the storage devices of a RAID group are prevented from reaching the upper limit of the number of write operations at the same time by replacing the storage device configuring the RAID group with a storage device set as a spare is explained as a second embodiment.

Here, replacement of a storage medium is processing to exclude one storage medium belonging to the RAID group from the RAID group and to incorporate another storage medium in the RAID group instead. In the second embodiment, according to a schedule created in advance, a storage device of target of replacement is selected from among the storage devices belonging to the RAID group.

The storage device is an example of the storage medium in the first embodiment. Further, the storage device configuring the RAID group is an example of the storage medium set as a data write destination in the first embodiment.

Figure 2:
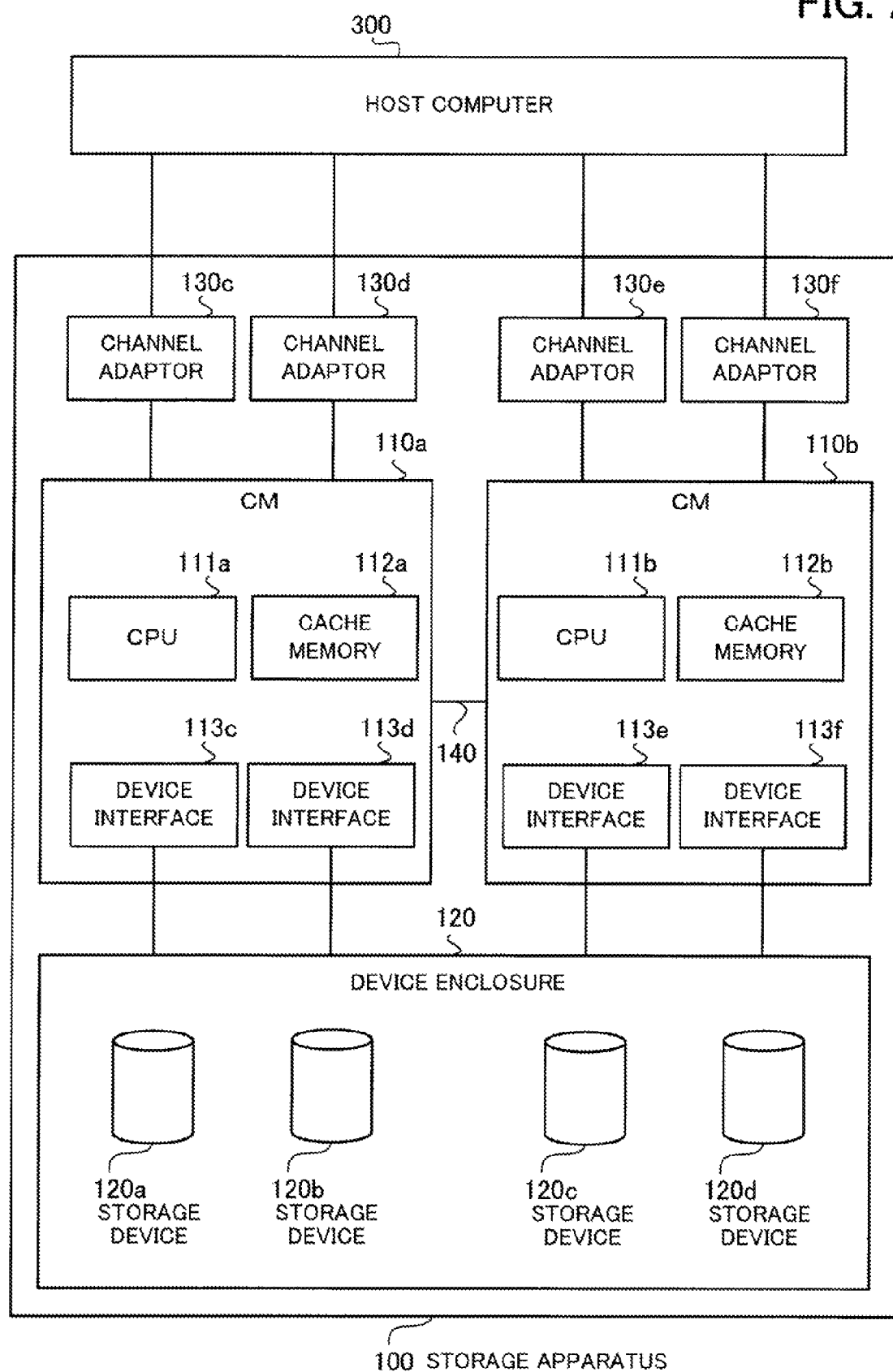
FIG. 2 illustrates hardware of a storage apparatus of a second embodiment.

FIG. 2 illustrates hardware of a storage apparatus of the second embodiment. A storage apparatus 100 has controller modules (CM) 110a and 110b configured to control the whole of the apparatus, channel adapters 130c to 130f configured to control the connection between the controller modules 110a and 110b and a host computer 300, and a device enclosure 120 having storage devices 120a, 120b, 120c and 120d and a plurality of other storage devices not illustrated schematically.

The storage apparatus 100 inputs and outputs data from and to a plurality of incorporated storage devices. The storage apparatus 100 has RAID functions, such as RAIDs 0 to 6, and manages each RAID as one storage device by configuring the RAID by integrating the plurality of storage devices.

The host computer 300 is a computer configured to perform job processing and connected to the storage apparatus 100 so as to enable data communication via a storage area network (SNA) configured by the Fiber Channel. The host computer 300 saves data used for job processing in the storage apparatus 100 and reads the data from the storage apparatus 100.

The controller module 110a has a CPU (Central Processing Unit) 111a, a cache memory 112a, and device interfaces 113c and 113d.

The CPU 111a performs processing in accordance with an OS (Operating System) and performs various kinds of control. Further, the controller module 110a manages the resources, such as the cache memory 112a, the storage devices 120a, 120b, 120c, and 120d and other storage devices possessed by the device enclosure 120, and the channel adapters 130c and 130d.

The cache memory 112a stores control data necessary for the CPU 111a to control the storage apparatus 100. Further, the cache memory 112a temporarily stores input and output data read from and written to each storage device possessed by the device enclosure 120.

The device interfaces 113c and 113d control the connection with each storage device possessed by the device enclosure 120.

The controller module 110a and the controller module 110b are connected by a bus 140. Control information and data are communicated between the controller module 110a and the controller module 110b via the bus 140. The controller modules 110a and 110b function as a controller and may be attached to and detached from the storage apparatus 100. Here, the controller module 110b has the same configuration as that of the controller module 110a, and therefore, explanation thereof is omitted.

The device enclosure 120 has a plurality of storage devices, such as the storage devices 120a to 120d. By the plurality of storage devices within the device enclosure 120, a RAID group is generated. A RAID group is a logical storage region using the technology of RAID.

The storage devices 120a to 120d and other storage devices possessed by the device enclosure 120 are SSDs capable of configuring an RAID. The storage devices 120a to 120d store data or backup data of a user of the system transmitted from the host computer 300. An SSD is a storage medium that uses a flash memory and excellent in the random access performance, but, an upper limit is set to the number of write operations and if used more than the times exceeding the upper limit of the number of write operations, there is a possibility of the occurrence of a failure. The data and backup data of a user of the system do not need to be stored in one storage device and may be stored dispersedly in a plurality of storage devices. Further, data and backup data of a plurality of users may be stored in one storage device. It may also be possible to use a storage medium which is other than the SSD and to which an upper limit is set to the number of write operations, the number of times of use, and the in-use time or a storage medium affected considerably by the number of times of use and the in-use time as the storage devices 120a to 120d. For example, a storage device using a flash memory other than the SSD may be used as the storage devices 120a to 120d. Further, a storage medium using a nonvolatile semiconductor memory, such as an EEPROM (Electrically Erasable Programmable Read-Only Memory), other than the flash memory may be used as the storage devices 120a to 120d. Furthermore, the storage devices 120a to 120d may be a hard disk drive (HDD) that records data on a magnetic storage medium.

The channel adapters 130c to 130f control the connection between the host computer 300 and the controller modules 110a and 110b. For example, the channel adapter 130c receives a request from the host computer 300 and controls the connection with the controller module 110a. Each of the controller modules 110a and 110b may be connected to the plurality (two for each in FIG. 2) of the channel adapters 130c to 130f. That is, the controller module 110a is connected, for example, to the two different channel adapters 130c and 130d, respectively, to implement a redundant configuration.

Communication between the channel adapters 130c to 130f and the host computer 300 is connected by a SAN configured by the Fibre Channel, but, may be connected by a connection system other than the Fibre Channel. Further, communication between the channel adapters 130c to 130f and the host computer 300 may be established by installing the storage apparatus 100 in a remote place apart from the host computer 300 using a dedicated line or VPN (Virtual Private Network).

In FIG. 2, the two controller modules 110a and 110b are illustrated and the device interfaces 113c to 113f and the channel adapters 130c to 130f are illustrated in twos for each of the controller modules 110a and 110b, but, the numbers of these are arbitrary. The device enclosure 120 is illustrated alone, but, the number of the device enclosures is arbitrary.

By the hardware configuration as above, it is possible to implement the processing functions of the present embodiment.

Figure 3:
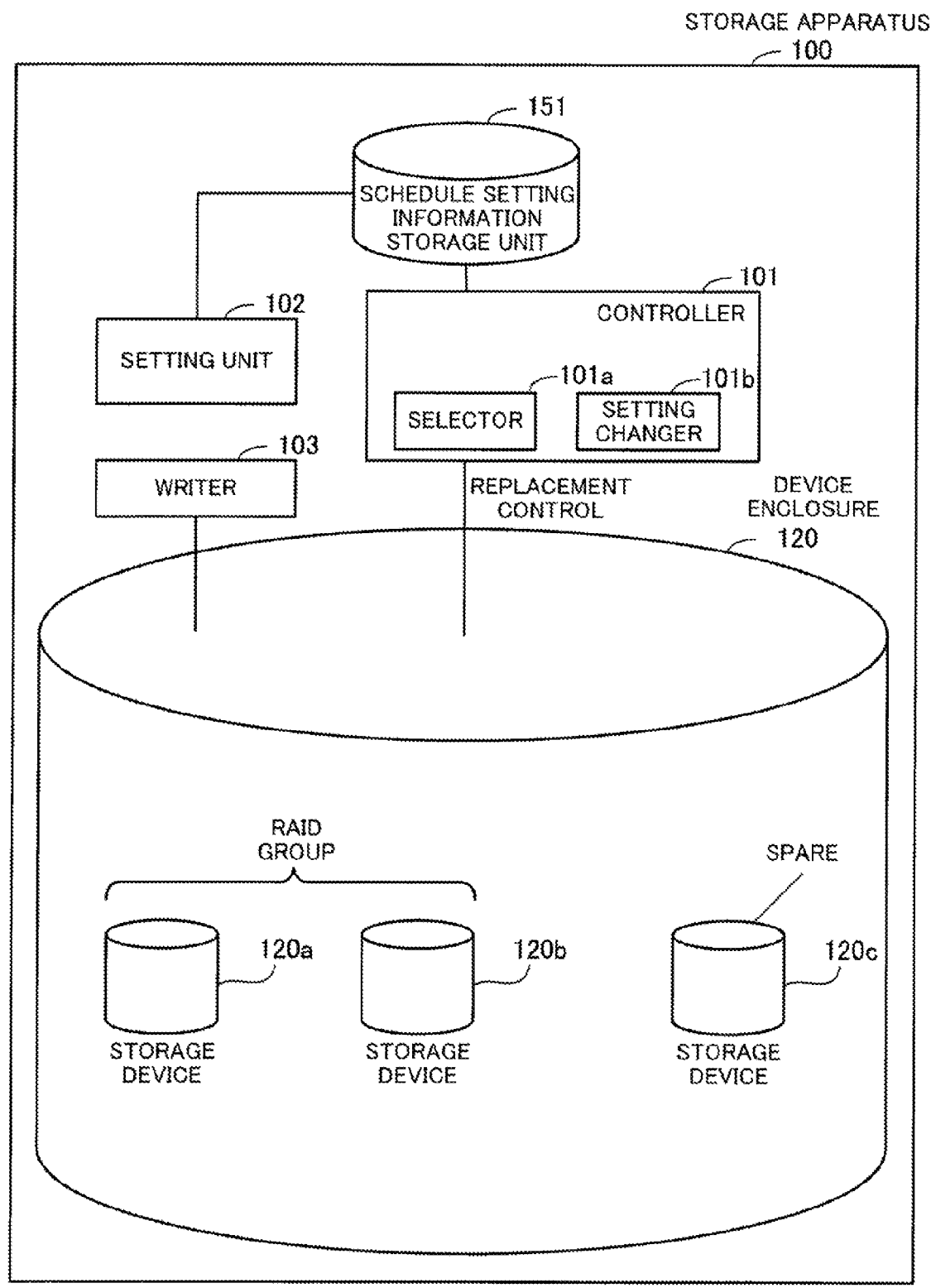
FIG. 3 is a block diagram illustrating functions of the storage apparatus of the second embodiment.

FIG. 3 is a block diagram illustrating the functions of the storage apparatus of the second embodiment. The storage apparatus 100 of the second embodiment has a controller 101, a setting unit 102, a writer 103, the device enclosure 120, and a schedule setting information storage unit 151.

The controller 101 has a selector 101a and a setting changer 101b.

The selector 101a selects a storage device to be replaced with the spare storage device 120c from among the storage devices 120a and 120b belonging to the RAID group on the basis of a schedule based on schedule setting information stored in the schedule setting information storage unit 151. For example, in the schedule setting information, the length of the period during which each storage device belongs to the RAID group during the unit period is defined. In such a case, the selector 101a selects a storage device so that the length of the period during which each storage device belongs to the RAID group during the unit period agrees with the schedule. At this time, as will be described later, the selector 101a preferentially selects a storage device with the relatively shorter mounted period as a target of replacement based on the schedule setting information. Further, the selector 101a increases the difference in the number of write operations by suppressing replacement of the storage device with the longer mounted period and by shortening the intervals of replacement.

Here, it is assumed that the storage device 120b is selected as a target of replacement. Then, the setting changer 101b copies the data stored in the storage device 120b selected as a target of replacement to the spare storage device 120c. After the copying of the data is completed, the setting changer 101b replaces the storage device 120b selected as a target of replacement with the spare storage device 120c. That is, the setting changer 101b performs setting to exclude the storage device 120b selected as a target of replacement from the RAID group and performs setting to incorporate the spare storage device 120c in the RAID group. Thereby, the selected storage device 120b belonging to the RAID group is replaced with the spare storage device 120c and the storage device 120c having been set as a spare belongs to the RAID group and the storage device 120b having been belonging to the RAID group is set as a spare. Thereby, an increase in the number of write operations of the selected storage device 120b is suppressed. On the other hand, the number of write operations of the storage device 120a that is not selected and the storage device 120c having been set as a spare increases when write operation is performed on the RAID group.

The setting unit 102 sets schedule setting information based on the lengths of the mounted periods of the storage devices 120a and 120b belonging to the RAID group in the storage apparatus 100 and stores the set schedule setting information in the schedule setting information storage unit 151. At this time, the setting unit 102 sets schedule setting information so that the length of the standby period of the storage device with a shorter mounted period is longer.

The writer 103 writes data input from the host computer 300 to the storage device belonging to the RAID group.

The schedule setting information storage unit 151 stores schedule setting information indicating the schedule of replacement of the storage devices 120a and 120b belonging to the RAID group with the spare storage device 120c set by the setting unit 102.

The device enclosure 120 has the storage devices 120a, 120b and 120c. The storage devices 120a to 120c have a storage region capable of storing data. The storage apparatus 100 stores data transmitted from the host computer 300 etc. in the RAID group. The storage devices 120a and 120b belong to the RAID group storing the data. The storage device 120c is a spare and does not belong to the RAID group. The RAID group may be set by storage devices in an arbitrary number not less than two.

The storage device 120c is a spare storage device and normally, does not belong to the RAID group and stands by on hot standby with the power source turned on. The storage device 120c is incorporated in a RAID group in place of any of the storage devices belonging to the RAID group at the time of replacement based on the schedule indicated in the schedule setting information. When the storage device 120a or 120b in the RAID group or other storage devices, not illustrated schematically, fail, it is also possible to incorporate the storage device 120c in the RAID to which the failed storage devices have belonged in place of the failed storage device. The state when the storage device 120c stands by is not limited to the hot standby. For example, the storage device 120c may stand by on warm standby or may stand by on cold standby with the power source turned off, the power source being turned on when the storage device 120c is used.

The number of storage devices belonging to the RAID group and the number of spare storage devices the storage apparatus 100 of the second embodiment replaces at one-time replacement are arbitrary.

FIG. 4 illustrates a schedule setting table of the second embodiment. A schedule setting table 151a illustrated in FIG. 4 is stored in the schedule setting information storage unit 151 possessed by the storage apparatus 100 and managed by the setting unit 102 of the storage apparatus 100. The schedule setting table 151a is a table configured to store schedule setting information indicating the schedule based on which each storage device of the RAID group possessed by the storage apparatus 100 is incorporated and used.

In the schedule setting table 151a, as items, "Device number", "Mounted period length", "Priority", "In-use period length", and "Standby period length" are provided. In the schedule setting table 151a, information arranged in each item in the transverse direction is associated with another as schedule setting information.

The device number is a number allocated to each storage device to uniquely identify storage devices belonging to the RAID group and spare storage devices.

The mounted period length is information indicating the total period during which a storage device is mounted in the storage apparatus 100 in units of months at the time of creation of the schedule setting table 151a. The mounted period length is used to set priority. It may also be possible for the setting unit 102, for example, to acquire the mounted period length by collecting values indicating the energized time of each storage device using the S.M.A.R.T (Self-Monitoring Analysis and Reporting Technology).

The priority is a value set by the storage apparatus 100 based on the mounted period length and used to set the in-use period length.

The in-use period length is information indicating the length of period (in-use period) during which a storage device is incorporated and used in the RAID group during the unit period in units of months. The in-use period length is a value set by the storage apparatus 100 based on the priority for all the storage devices.

The standby period length is information indicating the length of period (standby period) during which a storage device incorporated in the RAID group stands by as a spare storage device after being replaced with another spare storage device in units of months. The standby period length is a value set by the storage apparatus 100 based on the in-use period length for all the storage devices. It is advisable to set the standby period length so that the standby period length of a storage device with a longer in-use period length is shorter and that of a storage device with a shorter in-use period length is longer.

Here, in the second embodiment, as will be described later in detail in the explanation of FIGS. 6A and 6B, a high priority (value of priority is small) is set to a storage device with a short mounted period length and a low priority (value of priority is large) is set to a storage device with a long mounted period length. Further, to a storage device with a high priority, the in-use period length is set short and to a storage device with a low priority, the in-use period length is set long.

That is, the storage apparatus 100 sets a short in-use period length to a storage device with a short mounted period length and sets a long in-use period length to a storage device with a long mounted period length. Here, it is considered that there is a trend for the number of write operations of a storage device with a short mounted period length to be relatively small and for the number of write operations of a storage device with a long mounted period length to be relatively large. Because of this, a short in-use period length is set to a storage device with a short mounted period length the number of write operations of which up to the current point of time is considered to be small so that the period during which write is not performed is increased relatively by putting the storage device on standby. On the other hand, a long in-use period length is set to a storage device with a long mounted period length the number of write operations of which up to the current point of time is considered to be large so that the period during which it is put on standby is reduced relatively. Due to this, it is possible to suppress an increase in the number of write operations of a storage device with the small number of write operations. Further, the number of write operations of a storage device with the large number of write operations is increased more, and therefore, it is possible to increase the difference in the number of write operations between the storage devices belonging to the RAID group.

It may also be possible to use the priority to determine the order of replacement of the storage device with a spare storage device. That is, by replacing the storage devices in the descending order from the highest priority with a spare storage device and putting the replaced storage device on standby, it is possible to suppress an increase in the number of write operations of a storage device with a high priority. Thereby, it is possible to increase the difference in the number of write operations between the storage devices belonging to the RAID group.

Figure 5A:
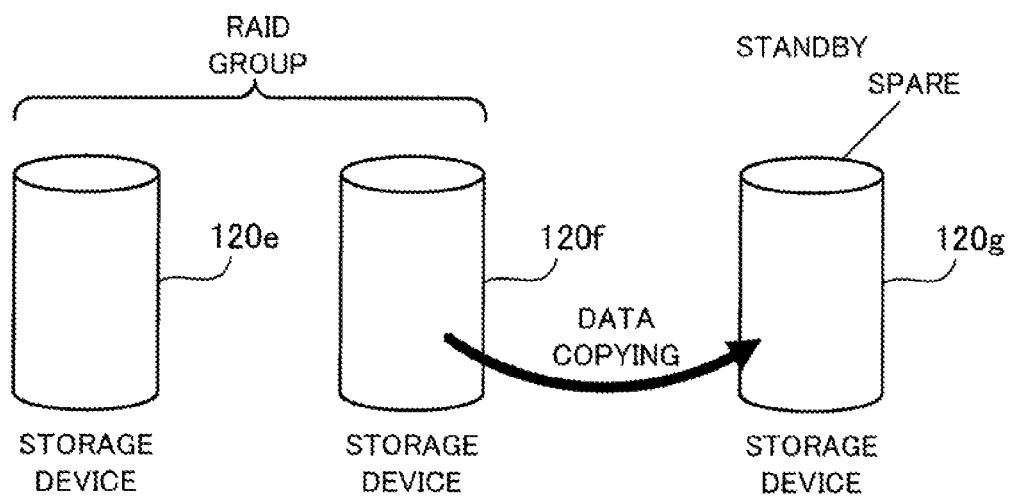
FIGS. 5A and 5B illustrate an operation at the time of data copying and replacement of a storage device of the second embodiment.
Figure 5B:
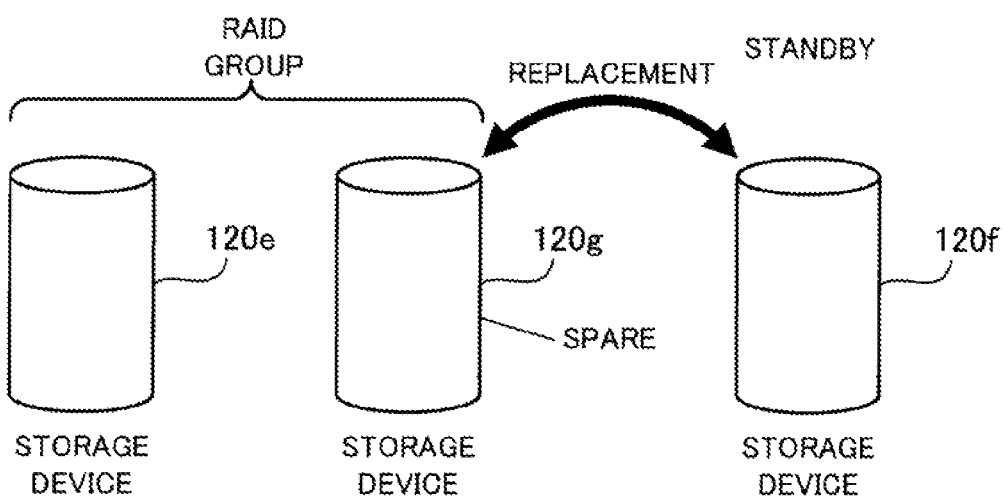

FIGS. 5A and 5B illustrate the operation at the time of data copying and replacement of the storage device of the second embodiment. FIG. 5A illustrates the operation at the time of data copying from a storage device 120f belonging to the RAID group to a spare storage device 120g in the second embodiment. FIG. 5B illustrates the operation at the time of replacement of the storage device 120f belonging to the RAID group with the spare storage device 120g in the second embodiment. Here, in FIG. 5A and FIG. 5B, it is assumed that the replacement of the storage device 120f belonging to the RAID group with the spare storage device 120g is determined based on schedule setting processing and storage device replacement processing, to be described later.

It is advisable for the storage apparatus 100 of the second embodiment to copy the data stored in advance in the storage device 120f to the spare storage device 120g put on standby at the time of replacement of the storage device 120f with the storage device 120g as illustrated in FIG. 5A. With this operation, it is possible to prevent the suspended time of operation of the RAID group from being prolonged when the storage device 120g is included in the RAID group in place of the storage device 120f.

Next, as illustrated in FIG. 5B, the storage apparatus 100 replaces the storage device 120f with the storage device 120g. The storage apparatus 100 replaces a storage device 120e or the storage device 120f belonging to the RAID group with a spare storage device not belonging to the RAID group based on a predetermined schedule even though the storage devices 120e and 120f are normal in order to increase the difference in the number of write operations between the storage devices. Thereby, the storage devices belonging to the RAID group are prevented from reaching the upper limit of the number of write operations at the same time.

When a failure has occurred in the storage device 120e or 120f belonging to the RAID group, the storage apparatus 100 replaces the storage device in which a failure has occurred with the spare storage device 120g. When the failed storage device is replaced with a spare storage device, it is not necessary to perform replacement based on schedule setting processing and storage device replacement processing, to be described later, until the problem of the failure of the storage device 120e or 120f is solved by repair, replacement, etc.

Figure 6A:
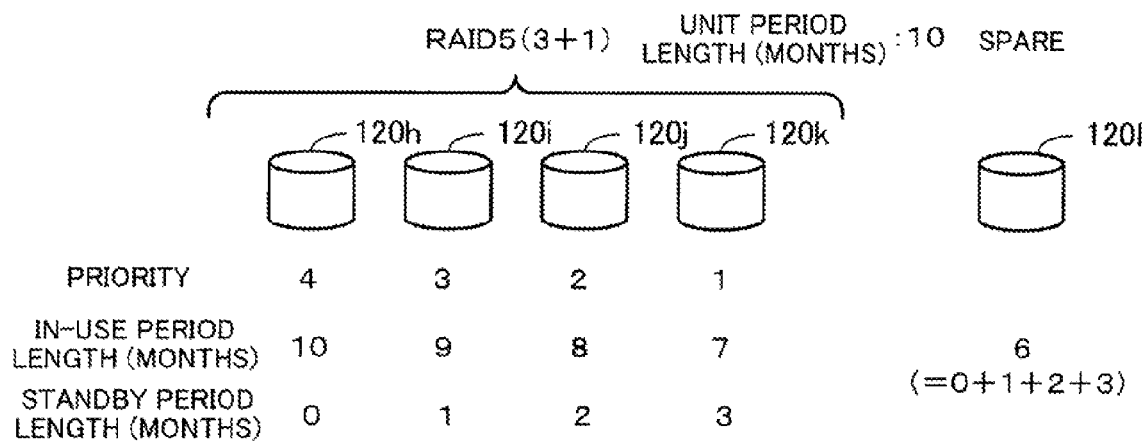
FIGS. 6A and 6B illustrate an operation at the time of calculation of a standby period length of the second embodiment.
Figure 6B:
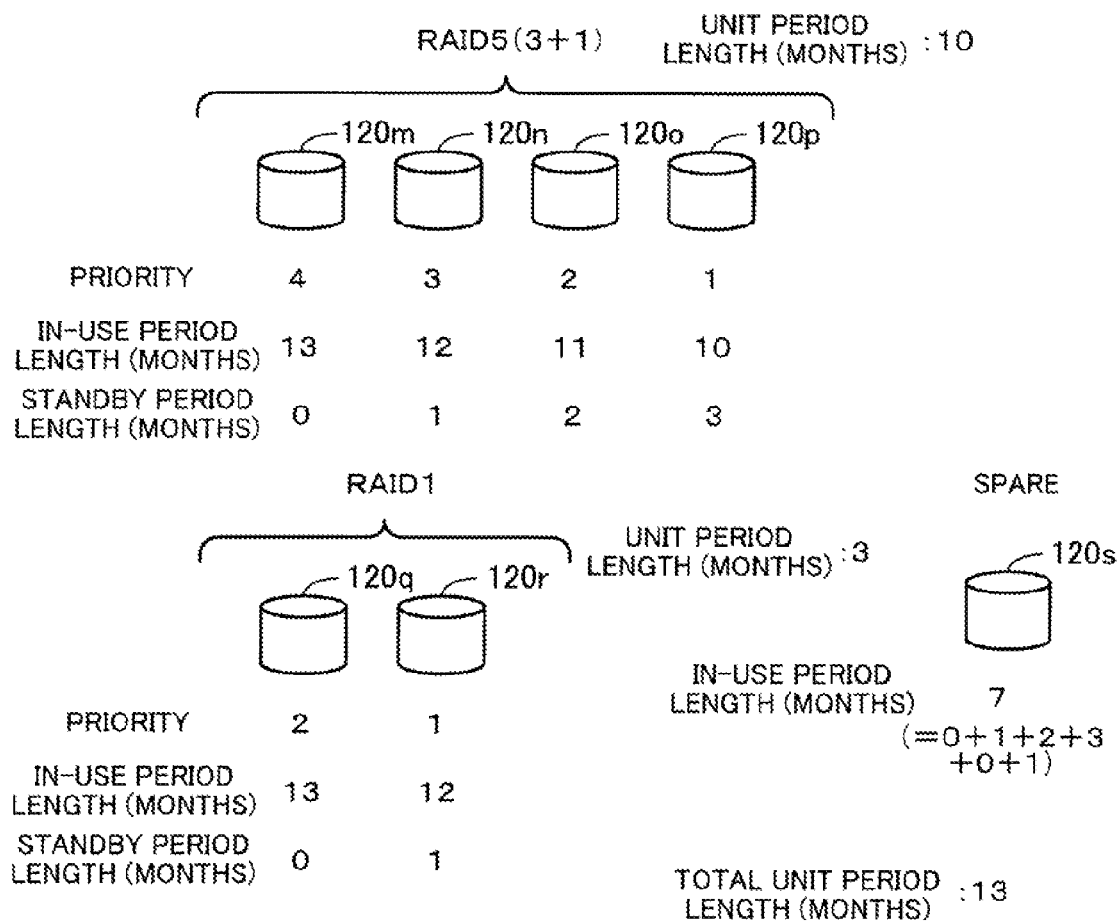

FIGS. 6A and 6B illustrate the operation at the time of calculation of the standby period length of the second embodiment. FIG. 6A illustrates the operation at the time of calculation of the standby period length when there is one RAID group in the second embodiment. FIG. 6B illustrates the operation at the time of calculation of the standby period length when there are two RAID groups in the second embodiment.

In accordance with FIG. 6A, calculation of the standby period length when there is one RAID group is illustrated. It is assumed that the storage apparatus 100 of the second embodiment has a RAID group with a configuration of RAID5 (3+1) of storage devices 120h, 120i, 120j and 120k and a spare storage device 120l as illustrated in FIG. 6A. In the RAID group of RAID5 (3+1), the storage capacity corresponding to three storage devices is used to save data and the storage capacity corresponding to one storage device is used to save redundant data. Further, it is assumed that priority "4" is set to the storage device 120h, priority "3" is set to the storage device 120i, priority "2" is set to the storage device 120j, and priority "1" is set to the storage device 120k.

In this case, the storage apparatus 100 calculates a unit time used as a unit for replacement of the storage devices and calculation and determination of the period according to Expression (1) below.

$$\text{UNIT TIME (MONTHS)} = \frac{\text{LIFETIME IN MONTHS OF STORAGE DEVICE (MONTHS)}}{\text{NUMBER OF STORAGE DEVICES (UNITS)}} \times \text{NUMBER OF SPARE STORAGE DEVICES (UNITS)} \quad (1)$$

(THE MAXIMUM OF UNIT TIME IS ASSUMED TO BE ONE)

Specifically, the lifetime in months of the storage device in Expression (1) is the lifetime in months set to the storage devices 120h to 120k. When there exist storage devices with different lifetimes in months, it may also be possible to use the lifetime in months of the storage device with the shortest lifetime in months. The number of storage devices in Expression (1) is the number of the storage devices 120h to 120k (for example, four) belonging to the RAID group in the storage apparatus 100. The number of spare storage devices is the number of the spare storage devices 120l (for example, one) in the storage apparatus 100.

In the second embodiment, the unit time is set to one month at maximum, but, it may also be possible to set an arbitrary period in accordance with the lifetime in months and the use frequency of the storage device. Further, it may also be possible to set the unit time to a fixed value (for example, one) to simplify calculation processing.

Next, the storage apparatus 100 calculates a unit period length, which is the length of a period (unit period) during which one cycle of replacement is completed in storage device replacement processing, to be described later, in accordance with Expression (2) below.

$$\text{UNIT PERIOD LENGTH (MONTHS)} = \text{UNIT TIME} \times \sum_{k=1}^{N} k \quad (2)$$

(N IS THE NUMBER OF STORAGE

DEVICES BELONGING TO RAID GROUP)

N in Expression (2) is the number of storage devices belonging to the RAID group and k is an integer not less than one. Specifically, the unit period length is calculated by the product of the unit time calculated by Expression (1) and the total sum of the sequence of integer from one to the number of storage devices belonging to the RAID group. In the example of FIG. 6A, four storage devices belong to the RAID group, and therefore, N=4. Here, when the unit time is one month, the unit period length is ten months (1+2+3+4). The unit period length may be set arbitrarily.

Next, the storage apparatus 100 calculates the in-use period length during which each of the storage devices 120h to 120k belonging to each RAID group is used during one unit period in accordance with Expression (3) below.

in-use period length=unit period length+priority−
number of storage devices of RAID group     (3)

Specifically, the in-use period length is calculated by adding the priority of the storage device to the unit period length calculated by Expression (2) and subtracting the number of storage devices of the RAID group. In the example of FIG. 6A, the in-use period length of the storage device 120h with priority "4" is ten months (10+4−4). The in-use period length of the storage device 120i with priority "3" is nine months (10+3−4). The in-use period length of the storage device 120j with priority "2" is eight months (10+2−4). The in-use period length of the storage device 120 k with priority "1" is seven months (10+1−4).

The calculated in-use period length is set to the schedule setting information stored in the schedule setting information storage unit 151. The setting is not limited to the above and it is possible to perform the setting by an arbitrary method, such as that the in-use period length is set short for a storage device with a high priority and set long for a storage device with a low priority. Further, the in-use period length of the spare storage device 120l may be calculated by the total of the standby period lengths (to be described later) of all the storage devices belonging to the RAID group.

Next, the storage apparatus 100 calculates the standby period length, which is the length of the period (standby period) from replacement to the next replacement in storage device replacement processing, to be described later, in accordance with Expression (4) below.

standby period length=unit period length−in-use
period length     (4)

Specifically, the standby period length is calculated by subtracting the in-use period length of the storage device calculated by Expression (3) from the unit period length calculated by Expression (2). The standby period length indicates the length of the period during which the storage device is put on standby during the unit period. In the example of FIG. 6A, the standby period length of the storage device 120h with the in-use period length of ten months is zero months (10−10). The standby period length of the storage device 120i with the in-use period length of nine months is one month (10−9). The standby period length of the storage device 120j with the in-use period length of eight months is two months (10−8). The standby period length of the storage device 120k with the in-use period length of seven months is three months (10−7).

Based on the standby period length of the storage device belonging to the RAID group, the length of period (in-use period length) during which the spare storage device is used during the unit period is obtained. That is, the total of the standby period lengths of the storage devices belonging to the RAID group is the in-use period length of the spare storage device. In the example of FIG. 6A, the in-use period length of the spare storage device 120l is six months (0+1+2+3).

The calculation method of the standby period length is not limited to the method based on Expression (4). It is possible to perform the setting by an arbitrary method, such as that the standby period length is long for a storage device with a high priority and is short for a storage device with a low priority. Here, in the second embodiment, data copying itself increases the number of write operations of the spare storage device 120l, and therefore, it is advisable to perform the setting so that the standby period of one storage device is continuous in order to reduce the number of times of replacement. In the storage device replacement processing to be described later, each storage device is replaced based on the standby period length set as above.

Next, in accordance with FIG. 6B, calculation of the standby period length when there are two RAID groups is illustrated. As illustrated in FIG. 6B, the storage apparatus 100 of the second embodiment has two RAID groups. The first one is a RAID group of RAID5 (3+1) by storage devices 120m, 120n, 120o and 120p. The second one is a RAID group of RAID1 by storage devices 120q and 120r. The storage apparatus 100 has a spare storage device 120s other than the storage devices belonging to the two RAID groups, respectively. It is assumed that to the storage device 120m, priority "4" is set, to the storage device 120n, priority "3" is set, to the storage device 120o, priority "2" is set, to the storage device 120p, priority "1" is set, to the storage device 120q, priority "2" is set, and to the storage device 120r, priority "1" is set.

In this case, the storage apparatus 100 calculates the unit time in accordance with Expression (1). The unit time to be calculated is common to each RAID group. Here, the number of storage devices in Expression (1) is the number of storage devices of the entire storage apparatus 100.

Here, in FIG. 6B, when there exist storage devices with different lifetimes in months, as the lifetime in months of the storage device in Expression (1), the lifetime in months of the storage device with the shortest lifetime in months of all the storage devices of the storage apparatus 100 may be used. The number of storage devices in Expression (1) is the total number of storage devices belonging to all the RAID groups in the storage apparatus 100. The number of spare storage devices is the number of spare storage devices in the storage apparatus 100.

Next, the storage apparatus 100 calculates the unit period length in accordance with Expression (5) below.

$$\text{UNIT PERIOD LENGTH (MONTHS)} = \text{UNIT TIME} \times \left[ \left( \sum_{k=1}^{N_1} k \right) + \left( \sum_{l=1}^{N_2} l \right) \right] \quad (5)$$

($N_1$ AND $N_2$ ARE THE NUMBERS OF STORAGE DEVICES

BELONGING TO RESPECTIVE RAID GROUPS)

$N_1$ in Expression (5) is the number of storage devices belonging to the first RAID group. $N_2$ is the number of storage devices belonging to the second RAID group and k and l are both integers not less than one. Specifically, the unit period length when the storage apparatus 100 has two RAID groups is the same as the calculation result by calculating the unit period length of each RAID group as in FIG. 6A and summing the calculated unit period lengths for all the RAID groups. In the example of FIG. 6B, the unit period length calculated from the first RAID group to which the four storage devices belong is ten months (1+2+3+4). The unit period length calculated from the second RAID group to which the two storage devices belong is three months (1+2). As a result of that, the unit period length in total is 13 months (10+3).

Next, the storage apparatus 100 calculates the in-use period length of the storage devices 120m to 120r in accordance with Expression (3). At this time, the number of storage devices of the RAID group in Expression (3) is assumed to be the number of storage devices belonging to the RAID group to which the storage device of target of calculation of the in-use period length belongs.

In the example of FIG. 6B, the in-use period lengths of the storage devices 120m to 120p belonging to the first RAID group to which RAID5 is applied are as follows.

The in-use period length of the storage device 120m with priority "4" is 13 months (13+4−4). The in-use period length of the storage device 120n with priority "3" is 12 months (13+3−4). The in-use period length of the storage device 120o with priority "2" is 11 months (13+2−4). The in-use period length of the storage device 120p with priority "1" is ten months (13+1−4).

The in-use period lengths of the storage devices 120q and 120r belonging to the second RAID group to which RAID1 is applied are as follows.

The in-use period length of the storage device 120q with priority "2" is 13 months (13+2−2). The in-use period length of the storage device 120r with priority "1" is 12 months (13+1−2).

Next, the storage apparatus 100 calculates the standby period lengths of the storage devices 120m to 120r in accordance with Expression (4).

In the example of FIG. 6B, the standby period lengths of the storage devices 120m to 120p belonging to the first RAID group to which RAID5 is applied are as follows.

The standby period length of the storage device 120m with the in-use period length of 13 months is zero months (13−13). The standby period length of the storage device 120n with the in-use period length of 12 months is one month (13−1). The standby period length of the storage device 120o with the in-use period length of 11 months is two months (13−11). The standby period length of the storage device 120p with the in-use period length of ten months is three months (13−10).

The standby period lengths of the storage devices 120q and 120r belonging to the second RAID group to which RAID1 is applied are as follows.

The standby period length of the storage device 120q with the in-use period length of 13 months is zero months (13−13). The standby period length of the storage device 120r with the in-use period length of 12 months is one month (13−12).

In the example of FIG. 6B, the in-use period length of the spare storage device 120s is seven months (0+1+2+3+0+1).

When the number of RAID groups possessed by the storage apparatus 100 is three or more, the storage apparatus 100 calculates the unit time common to each RAID group as in FIG. 6B. Next, the storage apparatus 100 calculates the unit period length of the whole of the storage apparatus 100 based on the unit time and the number of storage devices. Next, the storage apparatus 100 calculates the in-use period length of each storage device based on the unit period length, the priority within the RAID group, etc. Next, the storage apparatus 100 calculates the standby period length based on the in-use period length.

Figure 7:
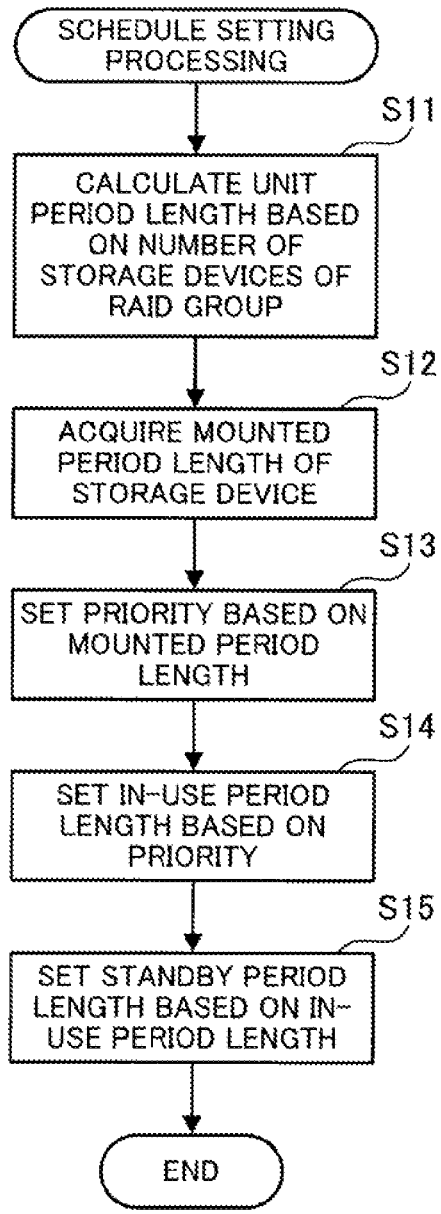
FIG. 7 is a flowchart illustrating schedule setting processing of the second embodiment.

FIG. 7 is a flowchart illustrating the schedule setting processing of the second embodiment. The storage apparatus 100 of the second embodiment performs the schedule setting processing to calculate the in-use period length of each storage device belonging to the RAID group. In the following, the schedule setting processing illustrated in FIG. 7 is explained in order of step number of the flowchart.

(Step S11) The setting unit 102 calculates the unit period length of the schedule based on the number of storage devices belonging to the RAID group.

(Step S12) The setting unit 102 acquires the mounted period length of each storage device belonging to the RAID group and sets the acquired mounted period length in the schedule setting information stored in the schedule setting information storage unit 151.

(Step S13) The setting unit 102 sets the priority of each storage device belonging to the RAID group based on the mounted period length of the schedule setting information stored in the schedule setting information storage unit 151 acquired at step S12. Further, the setting unit 102 sets the set priority in the schedule setting information stored in the schedule setting information storage unit 151. At this time, the setting is done so that the priority is low for the storage device with a long mounted period length and the priority is high for the storage device with a short mounted period length.

(Step S14) The setting unit 102 sets the in-use period length of each storage device belonging to the RAID group based on the priority set at step S13. Further, the setting unit 102 sets the set in-use period length in the schedule setting information stored in the schedule setting information storage unit 151. At this time, the setting is done so that the in-use period length is short for the storage device with a high priority and the in-use period length is long for the storage device with a low priority.

(Step S15) The setting unit 102 sets the standby period length of each storage device belonging to the RAID group based on the in-use period length set at step S14. Further, the setting unit 102 sets the set standby period length in the schedule setting information stored in the schedule setting information storage unit 151. It is possible to calculate the standby period length of each storage device by subtracting the in-use period length of the storage device from the unit period length. Thereby, the setting is done so that the standby period length is short for the storage device with a long in-use period length and the standby period length is long for the storage device with a short in-use period length. After that, the processing is terminated.

Figure 8:
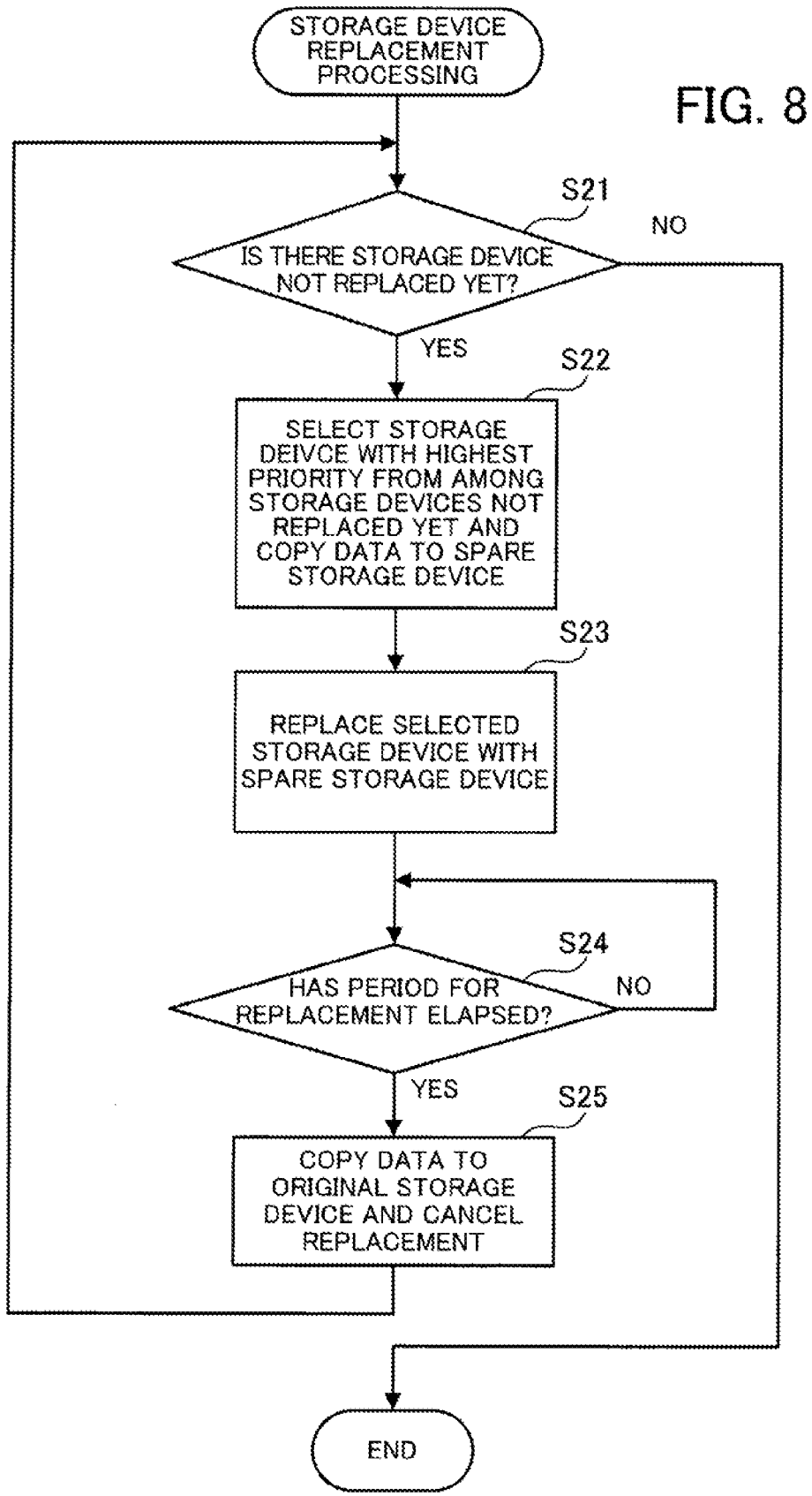
FIG. 8 is a flowchart illustrating storage device replacement processing of the second embodiment.

FIG. 8 is a flowchart illustrating the storage device replacement processing of the second embodiment. The storage apparatus 100 of the second embodiment performs the storage device replacement processing to replace each of the storage devices 120h to 120k belonging to the RAID group with the spare storage device 120l based on the priority and the in-use period length determined by the schedule setting processing. In the following, the storage device replacement processing illustrated in FIG. 8 is explained in the order of step number of the flowchart.

(Step S21) The selector 101a of the controller 101 determines whether or not there exists a storage device not replaced yet in the storage devices 120h to 120k belonging to the RAID group. When a storage device not replaced yet exists (step S21 YES), the processing is advanced to step S22. On the other hand, when no storage device not replaced yet exists (step S21 NO), the processing is terminated.

(Step S22) The selector 101a of the controller 101 selects a storage device (for example, 120i) with the highest priority from among the storage devices not replaced yet (for example, it is assumed that the storage devices 120h and 120i are not replaced yet). The setting changer 101b copies the data stored in the selected storage device 120i to the spare storage device 120l.

(Step S23) The setting changer 101b of the controller 101 replaces the storage device 120i selected at step S22 with the spare storage device 120l. Specifically, the setting changer 101b logically deletes the data of the storage device 120i and excludes the storage device 120i from the RAID group and puts on standby as a spare storage device. Further, the setting changer 101b includes the storage device 120l in the RAID group in place of the storage device 120i.

(Step S24) The setting changer 101b of the controller 101 determines whether or not the standby period from the replacement of the storage device 120i with the storage device 120l at step S23 to the next replacement has elapsed. Whether or not the standby period has elapsed may be determined by determining whether or not the standby period length of the storage device selected at step S22 has elapsed after the processing of step S23 is performed. When the standby period has elapsed (step S24 YES), the processing is advanced to step S25. On the other hand, when the standby period has not elapsed yet (step S24 NO), the processing of step S24 is repeated until the standby period elapses. Here, the standby period length is calculated by Expression (4) described above.

Because of the above, for a storage device with the high priority due to the short mounted period length and with the short in-use period length, the period during which the storage device is put on standby after being replaced with a spare storage device is relatively long. On the other hand, for a storage device with the low priority due to the long mounted period length and with the long in-use period length, the period during which the storage device is put on standby after being replaced with a spare storage device is relatively short. Consequently, an increase in the number of write operations of a storage device with a short mounted period is suppressed and the number of write operations of a storage device with a long mounted period length increases relatively. Because of this, the difference in the number of write operations between the storage devices belonging to the RAID group is increased.

(Step S25) The setting changer 101b of the controller 101 copies the data copied at step S22 and stored in the storage device 120l to the storage device 120i replaced with the spare storage device 120l at step S23. Further, the setting changer 101b logically deletes the data of the storage device 120l and excludes it from the RAID group again as a spare. Furthermore, the setting changer 101b includes the storage device 120i in the RAID group in place of the storage device 120l. After that, the processing is advanced to step S21.

In the storage device replacement processing of the second embodiment, after data is copied at step S22, the storage device is replaced at step S23, but, the order is not limited to this and it may also be possible to copy data after replacing the storage device.

As described above, in the storage apparatus 100 of the second embodiment, different in-use period lengths are set to the respective storage devices belonging to the RAID group and each storage device is used during the period indicated by the in-use period length within the unit period. Due to this, the use frequency of each storage device within the unit period differs and the number of write operations performed within the unit period differs for each storage device. As a result of that, it is made possible to prevent a plurality of storage devices from reaching the upper limit of the number of write operations at the same time.

Further, the schedule setting information is set so that the standby period length of a storage device with a short mounted period length is long, and therefore, the period during which a storage device with a short mounted period length, the number of write operations of which is considered to be small, stands by as a spare increases, and as a result of that, an increase in the number of write operations is suppressed. Due to this, it is possible to increase the difference in the number of write operations between storage devices.

Furthermore, a storage device with a short mounted period length is replaced preferentially, and therefore, an increase in the number of write operations of a storage device is suppressed in the ascending order of the number of write operations and an increase in the number of write operations between storage devices is promoted.

Third Embodiment

Next, a third embodiment is explained. Points different from those of the second embodiment are explained mainly and explanation of the same items is omitted. A storage apparatus of the third embodiment differs from that of the second embodiment in that each time a predetermined number of write operations is performed to the RAID group, a storage device of target of replacement is determined based the number of write operations of the storage device belonging to the RAID group and then the storage device is replaced.

Figure 9:
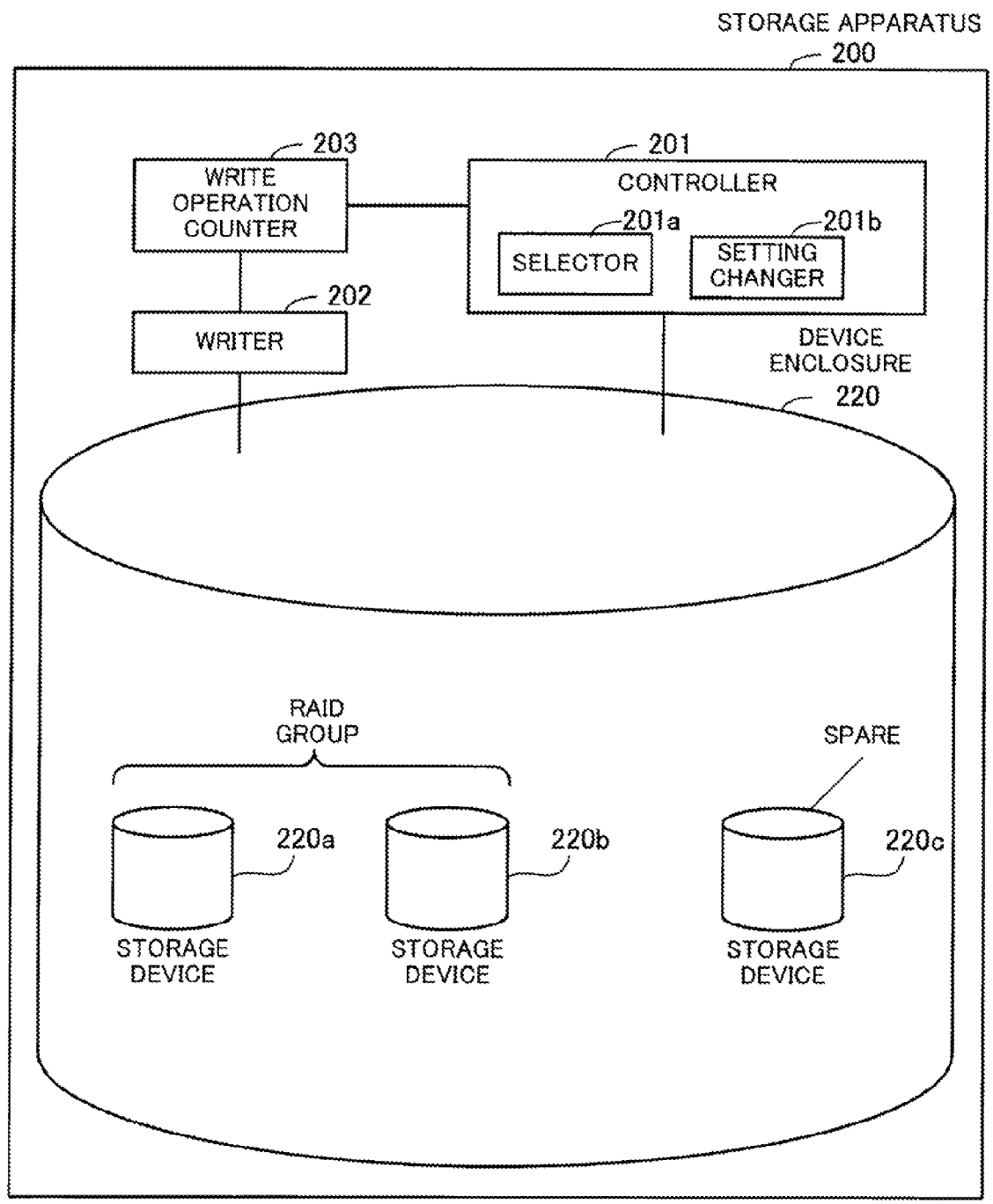
FIG. 9 is a block diagram illustrating a storage apparatus of a third embodiment.

FIG. 9 is a block diagram illustrating a storage device of the third embodiment. A storage apparatus 200 of the third embodiment has a controller 201, a writer 202, a write operation counter 203, and a device enclosure 220.

The controller 201 has a selector 201a and a setting changer 201b.

The selector 201a selects a storage device to be replaced with a spare storage device 220c from among storage devices 220a and 220b belonging to the RAID group based on the count result by the write operation counter 203. In the third embodiment, the selector 201a selects a storage device as a target of replacement, the replacement of which with the spare storage device 220c makes larger the difference in the number of write operations among the storage devices belonging to the RAID group after the replacement than that before the replacement. At this time, the selector 201a acquires the numbers of write operations of the storage devices 220a and 220b belonging to the RAID group based on the count result of the write operation counter 203 and calculates a difference in the number of write operations before the replacement. Further, the selector 201a acquires the number of write operations of the spare storage device 220c and calculates a difference in the number of write operations between the storage devices belonging to the RAID group after each of the storage devices 220a and 220b belonging to the RAID group is replaced with the storage device 220c. Then, the selector 201a compares the differences in the number of write operations before and after the replacement and selects a storage device of target of replacement and thus increases the difference in the number of write operations.

For example, as the difference in the number of write operations before replacement, the selector 201a calculates a difference in the number of write operations between the storage devices 220a and 220b belonging to the RAID group. Further, as the difference in the number of write operations after replacement, the selector 201a calculates a difference between the number of write operations of the spare storage device 220c after the spare storage device 220c is incorporated in the RAID group and the number of write operations of the storage device 220a. This is the difference in the number of write operations after the replacement when the storage device 220b is selected as a target of replacement. Furthermore, as the difference in the number of write operations after the replacement, the selector 201a calculates a difference between the number of write operations of the spare storage device 220c after the storage device 220c is incorporated in the RAID group and the number of write operations of the storage device 220b. This is the difference in the number of write operations after the replacement when the storage device 220a is selected as a target of replacement. The selector 201a selects a storage device of target of replacement so that the difference in the number of write operations after the replacement is larger than the difference in the number of write operations before the replacement based on the calculated differences in the number of write operations before and after the replacement.

When a spare storage device is incorporated in the RAID group, the data of the storage device to be excluded from the RAID group is copied to the spare storage device. The number of write operations to the spare storage device that occurs at the time of copying is taken to be the number of write operations at the time of copying. The selector 201a takes the number of write operations of the spare storage device before incorporation to which the number of write operations at the time of copying is added to be the number of write operations of the spare storage device after the spare storage device is incorporated in the RAID group. For example, it is possible to set an estimated value in advance in the selector 201a as the number of write operations at the time of copying.

The setting changer 201b copies the data stored in the storage device 220b selected as the target of replacement to the spare storage device 220c. After that, the setting changer 201b replaces the storage device 220b selected as the target of replacement with the spare storage device 220c. Due to this, the replacement of the selected storage device 220b belonging to the RAID group with the spare storage device 220c is performed and the storage device 220c having been a spare belongs to the RAID group and the storage device 220b having been belonging to the RAID group becomes a spare. Consequently, an increase in the number of write operations of the selected storage device 220b is suppressed and by the performance of write operation to the RAID group as to the storage device 220a that is not selected and the storage device 220c having been a spare, the number of write operations increases.

The writer 202 writes the data input from the host computer 300 to the storage device belonging to the RAID group.

The write operation counter 203 counts the number of write operations processing performed to the storage devices 220a and 220b belonging to the RAID group. For example, the write operation counter 203 monitors the operation of the writer 202. Then, the write operation counter 203 increments the value of the number of write operations of the storage device of data write destination each time the writer 202 performs writing. The selector 201a of the controller 201 acquires the result of count by the write operation counter 203 and performs determination of the replacement in the storage device replacement processing, to be described later, and at the same time, calculates the difference in the number of write operations between the storage devices.

The device enclosure 220 has the storage devices 220a, 220b and 220c. The storage devices 220a to 220c have a storage region capable of storing data. The storage apparatus 200 stores data transmitted from the host computer 300 etc. in the RAID group. The storage devices 220a and 220b belong to the RAID group that stores data. The storage device 220c is a spare and does not belong to the RAID group. It is possible to set the RAID group by an arbitrary number of storage devices.

The storage device 220c is a spare storage device and normally, does not belong to the RAID group but stands by on hot standby with the power source turned on. The storage device 220c is incorporated in the RAID group when the replacement of the storage device 220c with the storage device within the RAID group makes larger the difference in the number of write operations among the storage devices within the RAID group. When a failure occurs in the storage device 220a or 220b of the RAID group, or in another storage device, not illustrated schematically, the storage device 220c is incorporated in the RAID group to which the failed storage device has belonged in place of the failed storage device. The state when the storage device 220c stands by is not limited to the hot standby. For example, the storage device 220c may stand by on warm standby or may stand by on cold standby with the power source turned off, the power source being turned on when used.

The number of storage devices belonging to the RAID group and the number of spare storage devices that the storage apparatus 200 of the second embodiment replaces at one time are arbitrary.

Figure 10:
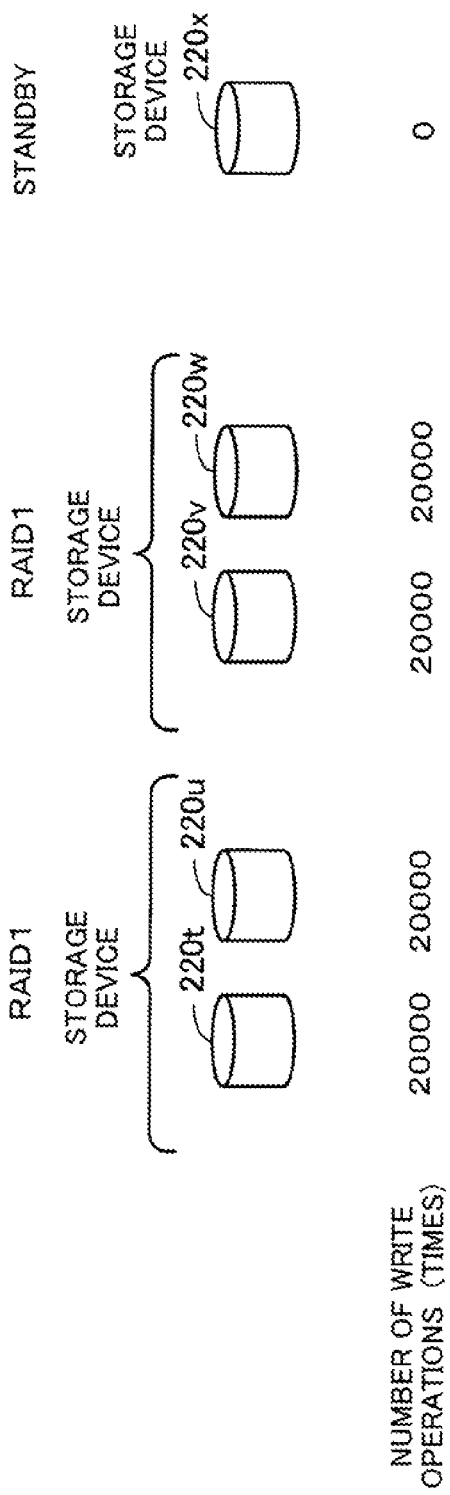
FIG. 10 illustrates an operation at the time of replacement of a storage device of the third embodiment.
Figure 11:
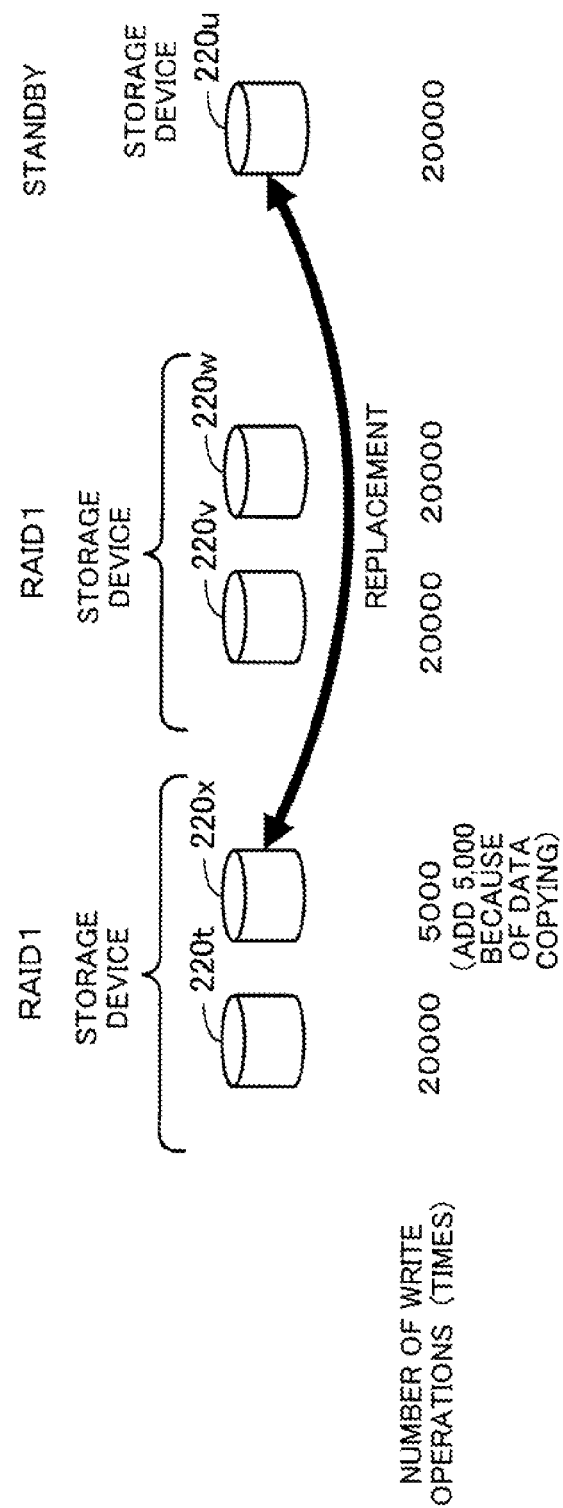
FIG. 11 illustrates the operation at the time of replacement of the storage device of the third embodiment.
Figure 12:
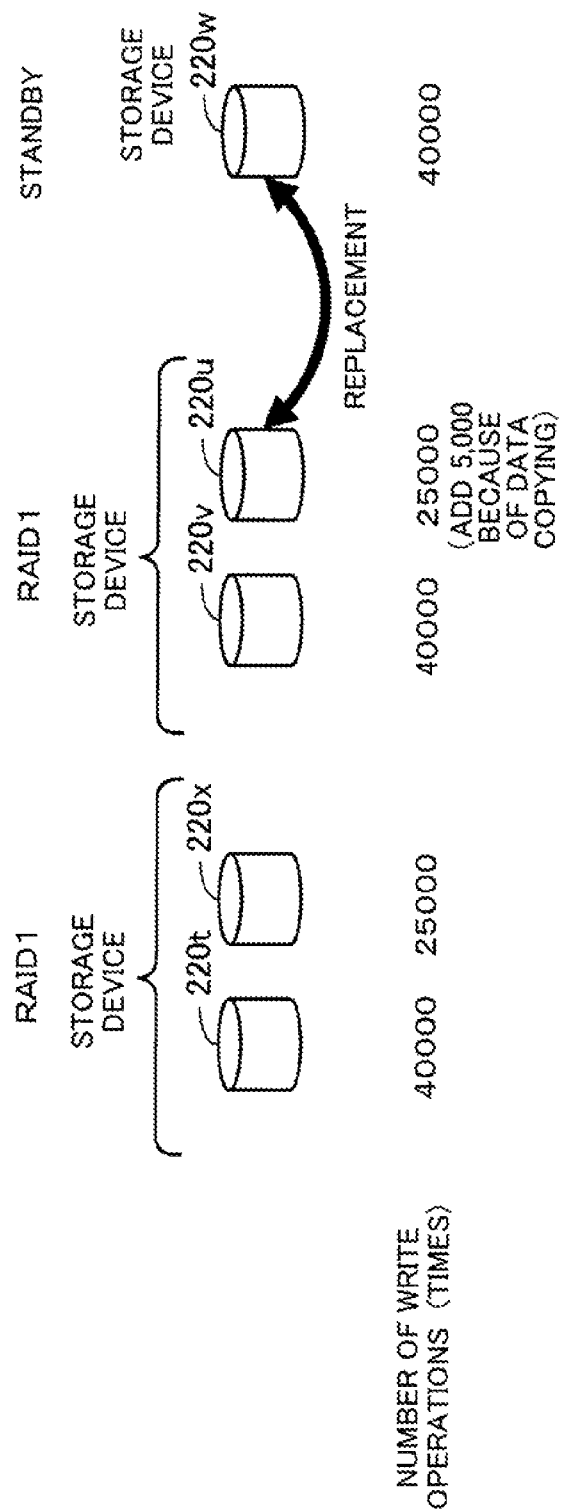
FIG. 12 illustrates the operation at the time of replacement of the storage device of the third embodiment.

FIG. 10 to FIG. 12 illustrate the operation at the time of replacement of storage devices of the third embodiment. In the third embodiment, the storage apparatus 200 monitors the number of write operations of each storage device. The storage device 220 selects a storage device the replacement of which makes larger the difference in the number of write operations in the RAID group each time the number of write operations for replacement set in advance is reached. Then, the storage apparatus 200 replaces the selected storage device within the RAID group with a spare storage device. Thereby, it is possible to increase the difference in the number of write operations among the storage devices of the RAID group.

Here, the storage apparatus 200 of the third embodiment calculates the number of write operations for replacement in accordance with Expression (6) below.

NUMBER OF WRITE OPERATIONS FOR REPLACEMENT (6)

$$\text{(TIMES)} = \frac{\text{UPPER LIMIT OF NUMBER OF WRITE OPERATIONS (TIMES)}}{\text{NUMBER OF STORAGE DEVICES (UNITS)}} \times \text{NUMBER OF SPARE STORAGE DEVICES (UNITS)}$$

(THE MAXIMUM OF NUMBER OF WRITE OPERATIONS FOR REPLACEMENT IS ASSUMED TO BE 1,000,000)

Specifically, the upper limit of the number of write operations of the storage device in Expression (6) is the upper limit of the number of write operations set to storage devices 220t to 220x. When there exist storage devices with different upper limits of the number of write operations, it may also be possible to use the upper limit of the number of write operations of the storage device with the smallest upper limit of the number of write operations. The number of storage devices in Expression (6) is, for example, the number (for example, four) of the storage devices 220t to 220w belonging to the RAID group in the storage apparatus 200. The number of spare storage devices is, for example, the number (for example, one) of spare storage devices, that is, the spare storage device 220x, in the storage apparatus 200.

It is also possible to set a maximum value to the number of write operations for replacement. When the calculation result by Expression (6) exceeds the maximum value, the maximum value is taken to be the number of write operations for replacement. For example, the maximum value is set to 1,000,000 times.

In the third embodiment, the number of write operations for replacement is assumed to be 80,000 times. Consequently, each time the total number of write operations of all the storage devices of the storage apparatus 200 after the previous storage device replacement processing is performed reaches 80,000 times, determination of the replacement of storage device is performed in the storage device replacement processing, to be described later. It is assumed that the estimated value of the number of write operations at the time of data copying (the number of write operations at the time of copying) from the storage device belonging to the RAID group to the spare storage device at the time of replacement and the actual number of write operations are 5,000 times. Not limited to 5,000 times, it is possible to arbitrarily set the number of write operations for replacement and the estimated value of the number of write operations at the time of copying.

As illustrated in FIG. 10, the storage apparatus 200 of the third embodiment has two RAID groups. The first one is a RAID group of RAID1 by the storage devices 220t and 220u. The second one is a RAID group of RAID1 by the storage devices 220v and 220w. The storage apparatus 200 has the spare storage device 220x besides the storage devices belonging to the two RAID groups, respectively.

It is assumed that write operation has been performed 20,000 times, respectively, to the storage devices 220t to 220w belonging to the RAID groups after being mounted in the storage apparatus 200. It is also assumed that the number of write operations after the spare storage device 220x is mounted in the storage apparatus 200 is zero times. Further, it is assumed that the storage device replacement processing is not at all performed on the storage devices 220t to 220x until the state illustrated in FIG. 10 is brought about. When the state illustrated in FIG. 10 is brought about, the total number of write operations of the storage devices 220t to 220x is 80,000 times, and therefore, the above-mentioned number of write operations for replacement is reached.

Consequently, as illustrated in FIG. 11, the storage apparatus 200 performs the replacement of storage device based on the storage device replacement processing, to be described later. At this time, the number of write operations of the storage devices 220t to 220w is the same before the replacement, and therefore, the difference in the number of write operations within the RAID groups increases when any of the storage devices is replaced. Here, it is assumed that the storage device 220u belonging to the RAID group is replaced with the spare storage device 220x. At this time, before the replacement, the data of the storage device 220u is copied to the storage device 220x. Due to this, the number of write operations of the storage device 220x increases from zero times by 5,000 times, reaching 5,000 times. Data is not copied to the storage device 220u that has become a spare by the replacement, and therefore, the number of write operations of the storage device 220u does not increase.

As described above, the storage apparatus 200 puts the storage device 220u on standby, which has once belonged to the RAID group and which is replaced with the spare storage device on standby as a new spare storage device. Due to this, it is no longer necessary to return the storage device 220u excluded from the RAID group to the original RAID group. Because of that, the write of data from the storage device 220x having been a spare to the storage device 220u is no longer necessary, which occurs when the storage device 220u is returned to the original RAID group. As a result of that, it is possible to suppress an increase in the number of write operations of the storage device 220u at the time of replacement.

Next, it is assumed that write operation has been performed 20,000 times, respectively, on the storage devices 220t, 220x, 220v, and 220w belonging to the RAID group. In this case, the numbers of write operations of the storage devices 220t, 220x, 220v, and 220w are 40,000 times, 25,000 times, 40,000 times, and 40,000 times, respectively. The total number of write operations from the previous determination of replacement in the storage device replacement processing of the storage devices 220t, 220x, 220v, and 220w is 80,000 times, reaching the above-mentioned number of write operations for replacement.

Consequently, as illustrated in FIG. 12, the storage apparatus 200 performs the replacement of storage devices based on the storage device replacement processing. At this time, the numbers of write operations of the storage devices 220t, 220x, 220v, and 220w before the replacement are 40,000 times, 25,000 times, 40,000 times, and 40,000 times, respectively. On the other hand, the number of write operations of the spare storage device 220u is 20,000. Consequently, when one of the storage devices 220v and 220w is replaced with the spare storage device 220u, the difference in the number of write operations within the RAID group increases. Here, it is assumed that the storage device 220w belonging to the RAID group is replaced with the spare storage device 220u. At this time, before the replacement, the data of the storage device 220w is copied to the storage device 220u. Due to this, the number of write operations of the storage device 220u increases from the 20,000 times by 5,000 times, reaching 25,000 times. Because of this, the difference in the number of write operations between the storage device 220v (40,000 times) belonging to the same RAID group and the storage device 220v (25,000 times) becomes 15,000 times. Here, the number of write operations of the storage device 220v is 40,000 times and the number of write operations of the storage device 220w is 40,000 times, and therefore, the difference in the number of write operations before the replacement of the RAID group is zero times. Consequently, the difference in the number of write operations increases by the replacement. Data is not copied to the storage device 220w that has become a spare by the replacement, and therefore, the number of write operations of the storage device 220w does not increase.

FIG. 13 illustrates the transition of the number of write operations of the storage device of the third embodiment. As illustrated in FIG. 13, the storage apparatus 200 has two RAID groups, RAID #1 and RAID #2. The configuration of the RAID #1 and RAID #2 is RAID1 and two storage devices belong thereto, respectively. It is assumed that one of the storage devices belonging to the RAID #1 is a storage device #1 and the other is a storage device #2. Further, it is assumed that one of the storage devices belonging to the RAID #2 is a storage device #3 and the other is a storage device #4. The storage apparatus 200 has five storage devices. It is assumed that the storage devices possessed by the storage apparatus 200 are SSD A, SSD B, SSD C, SSD D, and SSD E. Each of these SSDs A to E is set as any of the storage devices #1 to #4 of the RAIDs #1 and #2 and a spare storage device of the storage apparatus 200 and at the same time, is replaced by the storage device replacement processing, to be described later.

Here, it is assumed that the number of write operations for replacement is 80,000 times as described above. Further, it is assumed that the estimated value of the number of write operations of data copying and the actual number of write operations are 5,000 times. Hereinafter, in accordance with FIG. 13, the transition of the number of write operations of each storage device in the storage apparatus 200 of the third embodiment is explained. It is assumed that determination of replacement in the storage device replacement processing is not performed in the storage apparatus 200 before the first replacement.

(Before the first replacement) As the storage device #1 of the RAID #1, the SSD A is set and as the storage device #2, the SSD B is set. As the storage device #3 of the RAID #2, the SSD C is set and as the storage device #4, the SSD D is set. As the spare storage device, the SSD E is set. The number of write operations of the SSD A to SSD D is 20,000 times. The number of write operations of the SSD E is zero times. The total number of write operations of the SSD A to SSD D belonging to the RAIDs #1 and #2 reaches 80,000, and therefore, determination of replacement is performed.

Here, the storage apparatus 200 selects a RAID having a storage device with the largest number of write operations from among the RAIDs #1 and #2. At this time, the number of write operations of the SSD A to SSD D belonging to the RAIDs #1 and #2 is the same and 20,000 times. Because of that, it is possible for the storage apparatus 200 to select any RAID. Here, it is assumed that the RAID #1 is selected. The storage apparatus 200 determines a storage device of target of replacement of the storage devices of the selected RAID #1, the replacement of which makes larger the difference in the number of write operations between the storage devices belonging to the RAID #1 after the replacement than that before the replacement. At this time, the number of write operations of the SSD A and SSD B belonging to the RAID #1 is the same and 20,000 times. When the replacement is performed, the number of write operations of the SSD E set as the spare storage device reaches 5,000 times after the estimated value of number of write operations at the time of copying is added. Here, the propriety of replacement is explained in the case where the SSD B set as the storage device #2 is replaced with the SSD E set as the spare storage device. In this case, the difference in the number of write operations between the SSD A (the number of write operations is 20,000 times) set as the storage device #1 and the SSD E (the number of write operations (when the replacement is performed) is 5,000 times) to be set as the storage device #2 by the replacement is 15,000 times, and therefore, the difference in the number of write operations increases compared to the case where the replacement is not performed (the difference in the number of write operations is zero times). Consequently, it is possible to select the SSD B set as the storage device #2 of the RAID #1 as a target of replacement. Similarly, it is also possible to select the SSD A set as the storage device #1 of the RAID #1 as a target of replacement. In this case, it is possible for the storage apparatus 200 to select any SSD from among the SSD A and SSD B. In the example of FIG. 13, the SSD B is selected and the SSD B is replaced with the SSD E set as the spare storage device.

(After the first replacement) By the performance of the first replacement, the SSD A is set as the storage device #1 of the RAID #1. The number of write operations of the SSD A is 20,000 times. As the storage device #2, the SSD E is set. The number of write operations of the SSD E is 5,000 times. As the storage device #3 of the RAID #2, the SSD C is set. The number of write operations of the SSD C is 20,000 times. As the storage device #4, the SSD D is set. The number of write operations of the SSD D is 20,000 times. As the spare storage device, the SSD B is set. The number of write operations of the SSD B is 20,000 times.

(Before the second replacement) It is assumed that write operation has further been performed 20,000 times to the storage devices #1 to #4 belonging to the RAIDs #1 and #2, respectively, after the first replacement. As the storage device #1 of the RAID #1, the SSD A is set. The number of write operations of the SSD A is 40,000 times. As the storage device #2, the SSD E is set. The number of write operations of the SSD E is 25,000 times. As the storage device #3 of the RAID #2, the SSD C is set. The number of write operations of the SSD C is 40,000 times. As the storage device #4, the SSD D is set. The number of write operations of the SSD D is 40,000 times. As the spare storage device, the SSD B is set. The number of write operations of the SSD B is 20,000 times. The total number of write operations of the SSD A, SSD E, SSD C, and SSD D belonging to the RAIDs #1 and #2 after the previous determination of replacement reaches 80,000 times, which is the number of write operations for replacement, and therefore, determination of replacement is performed.

Here, the storage apparatus 200 selects a RAID having a storage device with the largest number of write operations from among the RAIDs #1 and #2. At this time, the number of write operations of the SSD A, SSD C, and SSD D belonging to the RAIDs #1 and #2 is the same and 40,000 times. Here, it is assumed that the RAID #1 is selected. In this case, the storage apparatus 200 determines whether or not there exists replacement of the storage device of the selected RAID #1 with the spare storage device, which replacement makes larger the difference in the number of write operations between the storage devices of the RAID #1. At this time, the number of write operations of the SSD A belonging to the RAID #1 is 40,000 times and the number of write operations of the SSD E is 25,000 times. When the replacement is performed, the number of write operations of the SSD B set as the spare storage device reaches 25,000 after the estimated value of the number of write operations is added. Consequently, the difference in the number of write operations when the SSD B set as the spare storage device is replaced with the SSD A belonging to the RAID #1 is zero times. The difference in the number of write operations when the SSD B set as the spare storage device is replaced with the SSD E is 15,000 times. Because of that, even if the replacement with the SSD A or SSD E is performed, the difference in the number of write operations after the replacement does not exceed the difference in the number of write operations between the SSD A and SSD E before the replacement, that is, 15,000 times, and therefore, the difference in the number of write operations before the replacement does not increase after the replacement. In particular, if the SSD A is replaced with the SSD B, the difference in the number of write operations after the replacement decreases from that before the replacement, and therefore, inappropriate. Consequently, the storage apparatus 200 aborts the selection of the RAID #1 and excludes the RAID #1 from the targets of selection. Next, it is assumed that the RAID #2 is selected. In this case, storage apparatus 200 determines whether or not there exists replacement of the storage device of the selected RAID #2 with the spare storage device, which replacement makes larger the difference in the number of write operations between the storage devices of the RAID #2. At this time, the number of write operations of the SSD C and SSD D belonging to RAID #2 is the same and 40,000 times. When the replacement is performed, the number of write operations of the SSD B set as the spare storage device as described above reaches 25,000 times after the estimated value of the number of write operations is added. Here, when the SSD D set as the storage device #4 is replaced with the SSD B set as the spare storage device, the difference in the number of write operations between the SSD C (the number of write operations is 40,000 times) set as the storage device #3 and the SSD B (the number of write operations (when the replacement is performed) is 25,000 times) to be set as the storage device #4 by the replacement reaches 15,000, and therefore, the difference in the number of write operations between the SSDs increases compared to that when the replacement is not performed (difference in the number of write operations is zero times). Consequently, the replacement of the SSD D set as the storage device #4 of the RAID #2 with the SSD B set as the spare storage device is performed.

(After the second replacement) By the performance of the second replacement, as the storage device #1 of the RAID #1, the SSD A is set. The number of write operations of the SSD A is 40,000 times. As the storage device #2, the SSD E is set. The number of write operations of the SSD E is 25,000 times. As the storage device #3 of the RAID #2, the SSD C is set. The number of write operations of the SSD C is 40,000 times. As the storage device #4, the SSD B is set. The number of write operations of the SSD B is 25,000 times. As the spare storage device, the SSD D is set. The number of write operations of the SSD D is 40,000 times.

(Before the third replacement) It is assumed that write operation has further been performed 20,000 times to the storage devices #1 to #4 belonging to the RAIDs #1 and #2, respectively, after the second replacement. As the storage device #1 of the RAID #1, the SSD A is set. The number of write operations of the SSD A is 60,000 times. As the storage device #2, the SSD E is set. The number of write operations of the SSD E is 45,000 times. As the storage device #3 of the RAID #2, the SSD C is set. The number of write operations of the SSD C is 60,000 times. As the storage device #4, the SSD B is set. The number of write operations of the SSD B is 45,000 times. As the spare storage device, the SSD D is set. The number of write operations of the SSD D is 40,000 times. The total number of write operations of the SSD A, SSD E, SSD C, and SSD B belonging to the RAIDs #1 and #2 after the previous determination of replacement reaches 80,000, which is the number of write operations for replacement, and therefore, determination of replacement is performed.

Here, the storage apparatus 200 selects a RAID having a storage device with the largest number of write operations from among the RAIDs #1 and #2. At this time, the number of write operations of the SSD A and SSD C belonging to the RAIDs #1 and #2 is the same and 60,000 times. Here, it is assumed that the RAID #1 is selected. In this case, the storage apparatus 200 determines whether or not there exists replacement of the storage device of the selected RAID #1, which replacement makes larger the difference in the number of write operations between the storage devices of the RAID #1. At this time, the number of write operations of the SSD A belonging to the RAID #1 is 60,000 times and the number of write operations of the SSD E is 45,000 times. When the replacement is performed, the number of write operations of the SSD D set as the spare storage device reaches 45,000 times after the estimated value of the number of write operations is added. Consequently, even if the replacement of the SSD D set as the spare storage device with the SSD A (the difference in the number of write operations when the replacement is performed is zero times) or SSD E (the difference in the number of write operations after the replacement is performed is 15,000 times) belonging to the RAID #1 is performed, the difference in the number of write operations after the replacement does not increase from that before the replacement. Consequently, the storage apparatus 200 aborts the selection of the RAID #1 and excludes the RAID #1 from the targets of selection. Next, it is assumed that the RAID #2 is selected. In this case, storage apparatus 200 determines whether or not there exists replacement of the storage device of the selected RAID #2, which replacement makes larger the difference in the number of write operations between the storage devices of the RAID #2. At this time, the number of write operations of the SSD C belonging to RAID #2 is 60,000 times and the number of write operations of the SSD B is 45,000 times. When the replacement is performed, the number of write operations of the SSD D set as the spare storage device as described above reaches 45,000 times after the estimated value of the number of write operations is added. Consequently, even if the replacement of the SSD D set as the spare storage device with the SSD C (the difference in the number of write operations when the replacement is performed is zero times) or SSD B (the difference in the number of write operations when the replacement is performed is 15,000 times) belonging to the RAID #2 is performed, the difference in the number of write operations after the replacement does not increase from that before the replacement. Consequently, the storage apparatus 200 aborts the selection of the RAID #2 and excludes the RAID #1 from the targets of selection. Due to this, there is no longer a RAID of target of selection, and therefore, replacement is not performed.

(After the third replacement (no replacement)) The third replacement is not performed, and therefore, the states of the storage devices #1 to #4 of the RAIDs #1 and #2 do not change from those before the third replacement.

(Before the fourth replacement) It is assumed that write operation has further been performed 20,000 times to the storage devices #1 to #4 belonging to the RAIDs #1 and #2, respectively, after the third replacement. As the storage device #1 of the RAID #1, the SSD A is set. The number of write operations of the SSD A is 80,000 times. As the storage device #2, the SSD E is set. The number of write operations of the SSD E is 65,000 times. As the storage device #3 of the RAID #2, the SSD C is set. The number of write operations of the SSD C is 80,000 times. As the storage device #4, the SSD B is set. The number of write operations of the SSD B is 65,000 times. As the spare storage device, the SSD D is set. The number of write operations of the SSD D is 40,000 times. The total number of write operations of the SSD A, SSD E, SSD C, and SSD B belonging to the RAIDs #1 and #2 after the previous determination of replacement reaches 80,000 times, which is the number of write operations for replacement, and therefore, determination of replacement is performed.

Here, the storage apparatus 200 selects a RAID having a storage device with the largest number of write operations from among the RAIDs #1 and #2. At this time, the number of write operations of the SSD A and SSD C belonging to the RAIDs #1 and #2 is the same and 80,000 times. Here, it is assumed that the RAID #1 is selected. In this case, the storage apparatus 200 determines whether or not there exists replacement of the storage device of the selected RAID #1, which replacement makes larger the difference in the number of write operations between the storage devices of the RAID #1. At this time, the number of write operations of the SSD A belonging to the RAID #1 is 80,000 times and the number of write operations of the SSD E is 65,000 times. When the replacement is performed, the number of write operations of the SSD D set as the spare storage device reaches 45,000 times after the estimated value of the number of write operations is added. Here, when the SSD E set as the storage device #2 is replaced with the SSD A set as the spare storage device, the difference in the number of write operations between the SSD A (the number of write operations is 80,000 times) set as the storage device #1 and the SSD D (the number of write operations (when the replacement is performed) is 45,000 times) to be set as the storage device #2 by the replacement is 35,000 times and the difference increases compared to that when the replacement is not performed (the difference in the number of write operations is 15,000 times). Consequently, the replacement of the SSD E set as the storage device #2 of the RAID #1 with the SSD D set as the spare storage device is performed.

(After the fourth replacement) By the performance of the fourth replacement, as the storage device #1 of the RAID #1, the SSD A is set. The number of write operations of the SSD A is 80,000 times. As the storage device #2, the SSD D is set. The number of write operations of the SSD D is 45,000 times. As the storage device #3 of the RAID #2, the SSD C is set. The number of write operations of the SSD C is 80,000 times. As the storage device #4, the SSD B is set. The number of write operations of the SSD B is 65,000 times. As the spare storage device, the SSD E is set. The number of write operations of the SSD E is 65,000 times.

Figure 14:
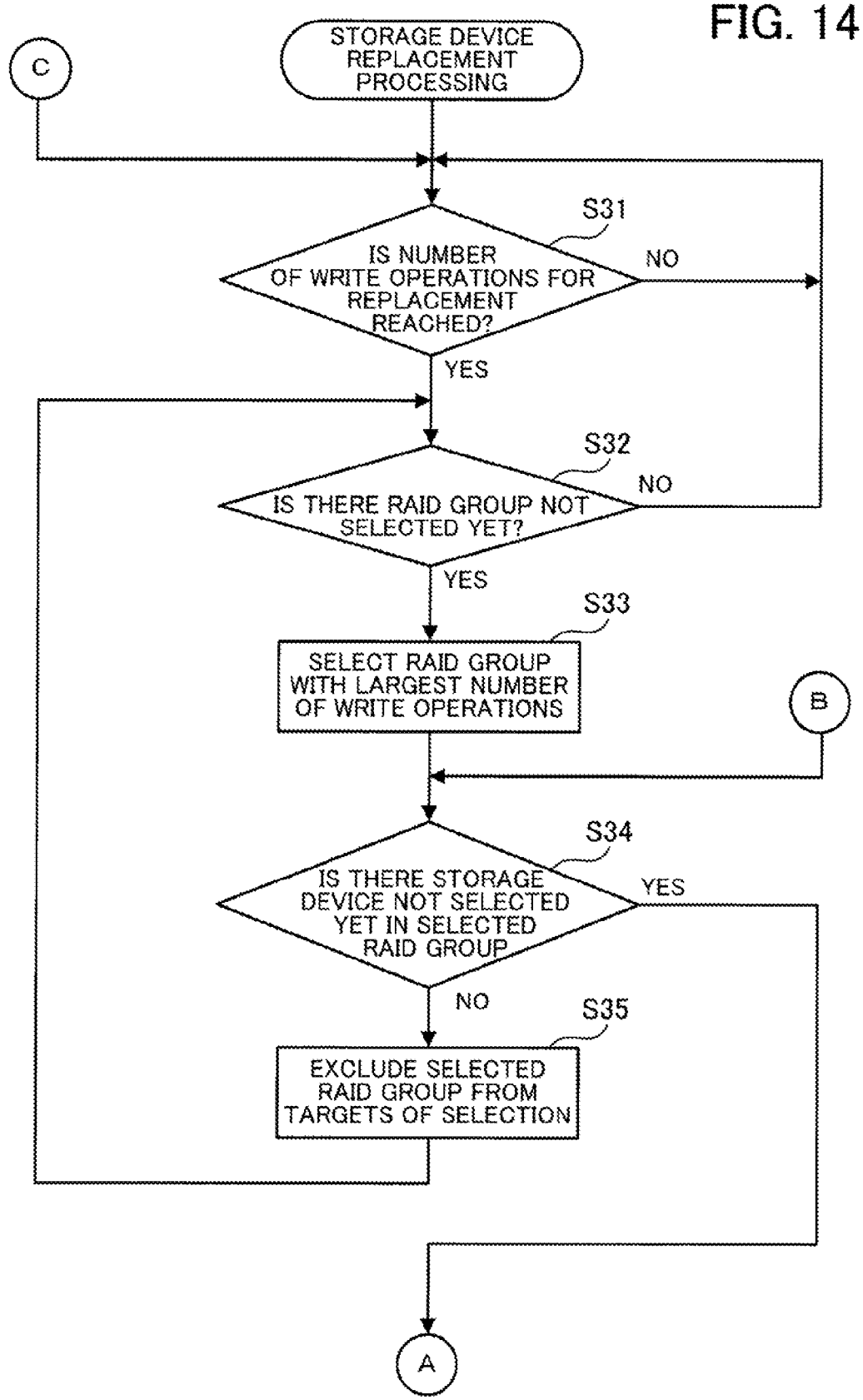
FIG. 14 is a flowchart illustrating storage device replacement processing of the third embodiment.
Figure 15:
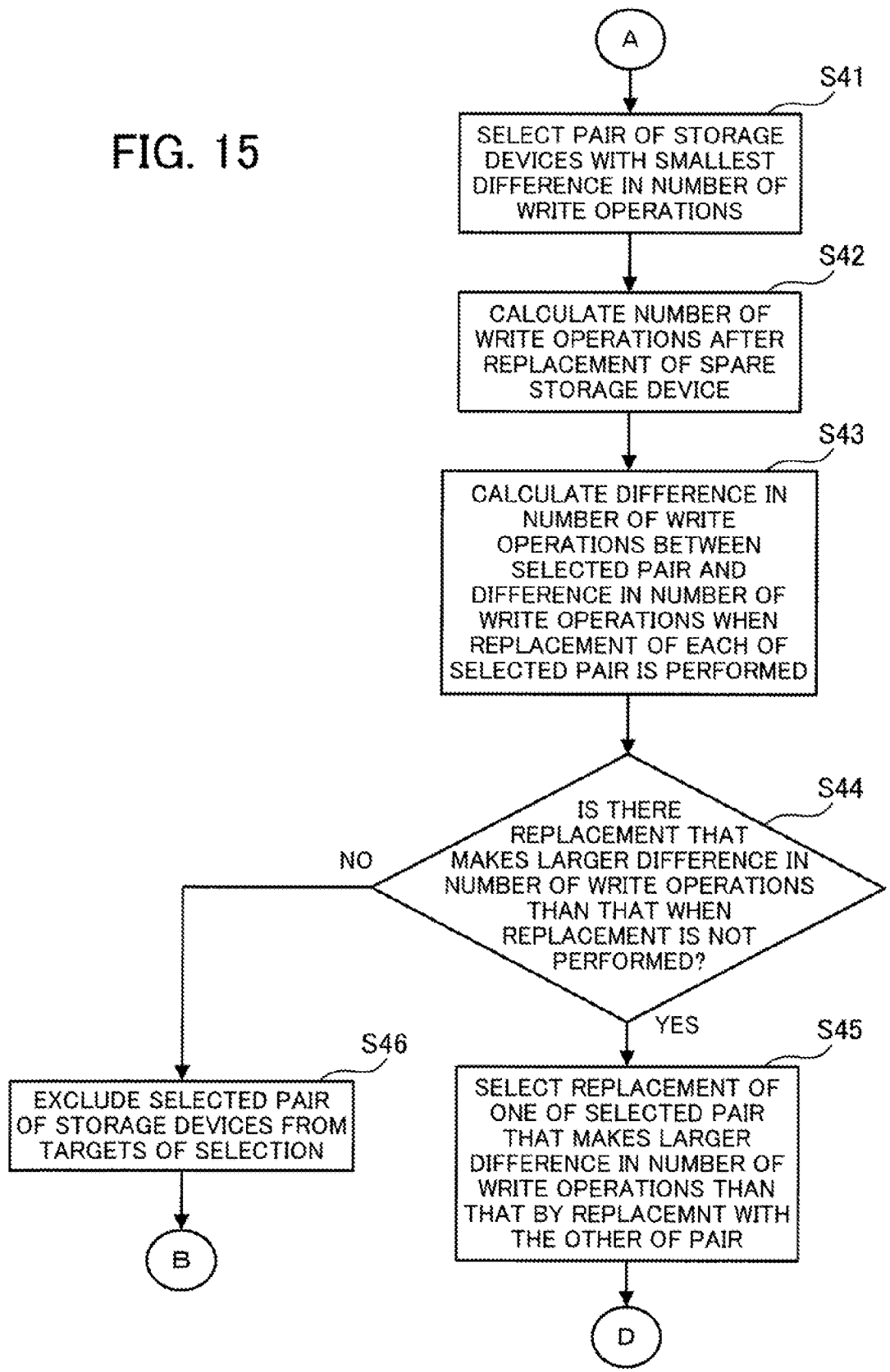
FIG. 15 is a flowchart illustrating storage device replacement processing of the third embodiment.
Figure 16:
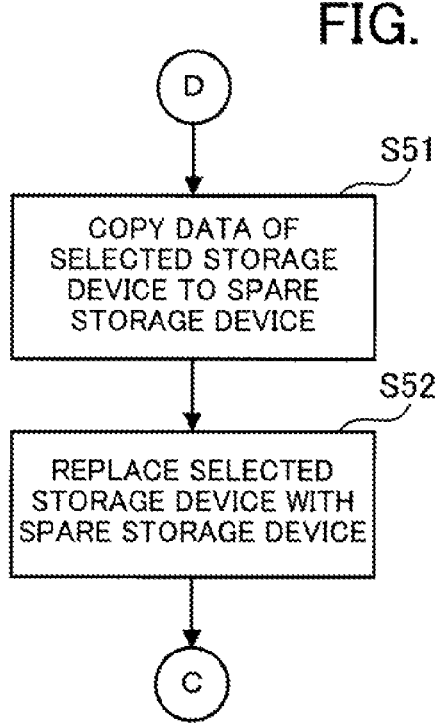
FIG. 16 is a flowchart illustrating storage device replacement processing of the third embodiment.

FIG. 14 to FIG. 16 are a flowchart illustrating the storage device replacement processing of the third embodiment. The storage apparatus 200 of the third embodiment performs the storage device replacement processing to replace the storage devices 220t to 220x belonging to the RAID group with a spare storage device each time a predetermined number of write operations is performed. In the following, the storage device replacement processing illustrated in FIG. 14 to FIG. 16 is explained in order of step number of the flowchart.

(Step S31) The selector 201a of the controller 201 sums the numbers of write operations of the whole of the storage apparatus 200 based on the count number of the write operation counter 203 and determines whether or not the number of write operations for replacement is performed. When the predetermined number of write operations is performed (step S31 YES), the processing is advanced to step S32. On the other hand, when the predetermined number of write operations is not performed yet (step S31 NO), the processing of step S31 is repeated until the predetermined number of write operations is performed.

(Step S32) The selector 201a of the controller 201 determines whether or not there exists a RAID group not selected yet in the RAID groups possessed by the storage apparatus 200. When there exists a RAID group not selected yet (step S32 YES), the processing is advanced to step S33. On the other hand, when there exists no RAID group not selected yet (step S32 NO), the selector 201a cancels the selection of a RAID group at step S32, the selection of a storage device at step S34, and the selection of a pair of storage devices at step S41 and brings into the state of not being selected yet. The write operation counter 203 resets the count number. After that, the processing is advanced to step S31.

(Step S33) The selector 201a of the controller 201 selects a RAID group with the largest number of write operations from among the RAID groups not selected yet. Here, the number of write operations of the RAID group may be the number of write operations of a storage device with the largest number of write operations of the respective RAID groups. Due to this, it is possible to increase the difference in the number of write operations between a storage device the number of write operations of which is closest to the upper limit number of write operations and another storage device in the same RAID group. Further, the number of write operations of the RAID group may be the sum of the numbers of write operations of the storage devices of the respective RAID groups. Due to this, by replacing a storage device of a RAID group the number of times of storage device replacement of which is small with a spare storage device, the difference in the number of write operations of the same RAID group is increased. Due to this, it is possible to increase the difference in the number of write operations between storage devices within a RAID group uniformly in a plurality of RAID groups possessed by the storage apparatus 200.

(Step S34) The selector 201a of the controller 201 determines whether or not there exists a storage device not selected yet in the RAID group selected at step S33. When there exists a storage device not selected yet (step S34 YES), the processing is advanced to step S41 (FIG. 15). On the other hand, when there exists no storage device not selected yet (step S34 NO), the processing is advanced to step S35.

(Step S35) The selector 201a of the controller 201 excludes the RAID group selected at step S33 from the targets of selection. After that, the processing is advanced to step S32.

(Step S41) The selector 201a of the controller 201 selects a pair of storage devices between which the difference in the number of write operations is the smallest from among the storage devices of the RAID group selected at step S33.

It may also be possible for the selector 201a to select a pair of a storage device with the largest number of write operations and a storage device the difference in the number of write operations from the storage device with the largest number of write operations is the smallest from among the storage devices of the RAID group selected at step S33. In this case, a pair of the storage device with the largest number of write operations and the storage device with the second largest number of write operations within the RAID group is selected. Due to this, it is possible to increase the difference in the number of write operations between the storage device the number of write operations of which is closest to the upper limit and the storage device the number of write operations of which is second closest to the upper limit within the RAID group, and therefore, it is possible to prevent the storage devices of the RAID group from reaching the upper limit of the number of write operations at the same time.

Further, by selecting the pair of the storage device with the largest number of write operations and the storage device with the second largest number of write operations, it is possible to prevent another storage device from reaching the upper limit of the number of write operations while the data is being copied from the storage device the number of write operations of which has reached the upper limit to a spare device. That is, it is supposed that the storage device with the largest number of write operations first reaches the upper limit of the number of write operations within the RAID group. When the storage device with the largest number of write operations reaches the upper limit of the number of write operations, the data within the storage device is copied to a spare storage device. Data copying takes a certain period of time. The larger the difference in the number of write operations between the storage device with the largest number of write operations and the storage device with the second largest number of write operations, the more suppressed the storage device with the second largest number of write operations from reaching the upper limit of the number of write operations before the data copying is completed.

(Step S42) The selector 201a of the controller 201 adds a predetermined number of times set in advance as an estimated value of the number of write operations that occurs by data copying in the spare storage device currently being set as a spare to the number of write operations at this point of time of the spare storage device. The selector 201a calculates the addition result as the number of write operations after replacement of the spare storage device.

(Step S43) The selector 201a of the controller 201 calculates the difference in the number of write operations between the pair of the storage devices selected at step S41 based on the count result of the write operation counter 203. The difference in the number of write operations between the selected pair of the storage devices is the difference before the replacement.

Further, the selector 201a calculates the difference in the number of write operations by comparing the number of write operations of one of the pair of the storage devices selected at step S41 and the number of write operations after replacement of the spare storage device.

Furthermore, the selector 201a calculates the difference in the number of write operations by comparing the number of write operations of the other of the pair of the storage devices selected at step S41 and the number of write operations after replacement of the spare storage device. Each of the numbers of write operations of the pair of storage devices selected at step S41 is obtained from the count result of the write operation counter 203. The number of write operations after replacement of the spare storage device is obtained from the result calculated at step S42.

(Step S44) The selector 201a of the controller 201 determines whether or not there exists replacement of one of the selected pair with a spare storage device, which replacement makes larger the difference in the number of write operations than that when the replacement is not performed based on the difference in the number of write operations calculated at step S43. When there exists replacement that makes larger the difference in the number of write operations than that when the replacement is not performed (step S44 YES), the processing is advanced to step S45. On the other hand, when there exists no replacement that makes larger the difference in the number of write operations than that when the replacement is not performed (step S44 NO), the processing is advanced to step S46.

(Step S45) The selector 201a of the controller 201 selects replacement of one of the selected pair with a spare storage device, which replacement makes larger the difference in the number of write operations than that when replacement of the other with a spare storage device is performed based on the difference in the number of write operations calculated at step S43. After that, the processing is advanced to step S51 (FIG. 16).

(Step S46) The selector 201a of the controller 201 excludes the pair of storage devices selected at step S41 from the targets of selection. Here, when the pair of storage devices is excluded from the targets of selection, the pair is no longer selected, but, if one of the pair is different, it may be a target of selection. After that, the processing is advanced to step S34.

(Step S51) The setting changer 201b of the controller 201 copies the data stored in the storage device the replacement of which is selected at step S45 to the spare storage device.

(Step S52) The setting changer 201b of the controller 201 replaces the storage device the replacement of which is selected at step S45 with the spare storage device. Specifically, the setting changer 201b logically deletes the data of the storage device the replacement of which is selected at step S45 and excludes from the RAID group, and then causes the storage device to stand by as a spare storage device. Further, the setting changer 201b includes the spare storage device in the RAID group in place of the storage device the replacement of which is selected at step S45. The selector 201a cancels the selection of the RAID group at step S32, the selection of the storage device at step S34, and the selection of the pair of storage devices at step S41 and brings into the state of not being selected yet. The write operation counter 203 resets the count number. After that, the processing advanced to step S31.

In the storage device replacement processing of the third embodiment, after the data is copied at step S51, the storage device is replaced at step S52, but, the order is not limited to this and it may also be possible to copy the data after performing replacement of the storage device.

As described above, in the storage apparatus 200 of the third embodiment, a storage device the replacement of which makes larger the difference in the number of write operations is replaced based on the count result of the number of write operations, and therefore, it is made possible to prevent a plurality of storage devices from reaching the upper limit of the number of write operations at the same time.

Further, the differences in the number of write operations between the storage devices belonging to the RAID group when the storage devices belonging to the RAID group are replaced with a spare storage device are calculated and compared and then a storage device of target of replacement is selected based on the difference in the number of write operations. Due to this, it is possible to select by comparison a storage device the replacement of which makes largest the difference in the number of write operations from among the storage devices belonging to the RAID group, and therefore, it is possible to effectively increase the difference in the number of write operations.

Furthermore, the number of write operations after replacement of a spare storage device is calculated based on the number of write operations at the time of replacement, which is an estimated number of write operations increased by the copying at the time of replacement and then a storage device of target of replacement is selected based on the calculation result of the number of write operations after replacement. Due to this, it is possible to calculate the difference in the number of write operations of a storage device by reflecting the influence of the copying at the time of replacement, and therefore, it is possible to appropriately perform selection of a storage device of target of replacement.

According to the disclosed storage apparatus and the storage apparatus control method, it is made possible to prevent a plurality of storage media from reaching the upper limit of the number of write operations at the same time.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A storage apparatus comprising:
 a plurality of storage media, wherein at least two storage media are set as a data write destination and at least one storage medium other than the storage media set as a data write destination is set as a spare; and
 one or more processors configured to perform a procedure including:

writing input data to a storage medium set as a data write destination;

counting the number of write operations performed on each of the plurality of storage media;

selecting a second storage medium as a target of replacement, wherein a difference between the number of write operations of a first storage medium set as a data write destination and the number of write operations of the second storage medium set as a data write destination is smaller than a difference between the number of write operations of the first storage medium, and a value determined based on the number of write operations of a third storage medium set as a spare and the number of write operations occurring at the time of copying of data within the second storage medium to the third storage medium;

copying the data stored in the second storage medium selected as a target of replacement to the third storage medium; and changing the setting of the second storage medium to a spare and the setting of the third storage medium to a data write destination.

2. The storage apparatus according to claim 1, wherein in the selecting, an estimated value set in advance is taken to be the number of write operations occurring at the time of copying of the data within the second storage medium to the third storage medium.

3. The storage apparatus according to claim 1, wherein in the selecting, a storage medium to be a target of replacement is selected each time data write operation is performed a predetermined number of times on the plurality of storage media.

4. A storage apparatus control method for controlling a storage apparatus including a plurality of storage media, in which at least two storage media are set as a data write destination and at least one storage medium other than the storage media set as a data write destination is set as a spare, the method comprising:

writing input data to a storage medium set as a data write destination;

counting the number of write operations performed on each of the plurality of storage media;

selecting a second storage medium as a target of replacement, wherein a difference between the number of write operations of a first storage medium set as a data write destination and the number of write operations of the second storage medium set as a data write destination is smaller than a difference between the number of write operations of the first storage medium, and a value determined based on the number of write operations of a third storage medium set as a spare and the number of write operations occurring at the time of copying of data within the second storage medium to the third storage medium;

copying the data stored in the second storage medium selected as a target of replacement to the third storage medium; and changing the setting of the second storage medium to a spare and the setting of the third storage medium to a data write destination.

5. A storage apparatus comprising:

a plurality of storage media, wherein at least two storage media are set as a data write destination and at least one storage medium other than the storage media set as a data write destination is set as a spare; and one or a plurality of processors configured to perform a procedure including:

writing input data to a storage medium set as a data write destination;

selecting a storage medium set as a data write destination as a target of replacement, based on a schedule in which the lengths of periods during which the respective storage media are set as data write destinations within a unit period are determined nonuniformly among the storage media;

copying the data stored in the storage medium selected as a target of replacement to the storage medium set as a spare; and changing the setting of the storage medium selected as a target of replacement to a spare and the setting of the storage medium set as a spare to a data write destination.

6. The storage apparatus according to claim 5, the procedure further includes setting a storage medium as a data write destination for a shorter time within the unit period when the storage medium has been mounted on the storage apparatus for a shorter period.

7. The storage apparatus according to claim 5, wherein the selecting selects a storage medium with a shorter mounted period length as a target of replacement earlier than a storage medium with a longer mounted period length within the unit period.

8. A storage apparatus control method for controlling a storage apparatus including a plurality of storage media, in which at least two storage media are set as a data write destination and at least one storage medium other than the storage media set as a data write destination is set as a spare, the method comprising:

writing input data to a storage medium set as a data write destination;

selecting a storage medium set as a data write destination as a target of replacement, based on a schedule in which the lengths of periods during which the respective storage media are set as data write destinations within a unit period are determined nonuniformly among the storage media;

copying the data stored in the storage medium selected as a target of replacement to the storage medium set as a spare; and changing the setting of the storage medium selected as a target of replacement to a spare and the setting of the storage medium set as a spare to a data write destination.

* * * * *